(12) United States Patent
Crowley et al.

(10) Patent No.: US 7,511,514 B2
(45) Date of Patent: Mar. 31, 2009

(54) PASSENGER SCREENING SYSTEM AND METHOD

(75) Inventors: Christopher W. Crowley, San Diego, CA (US); Richard Shelby, San Diego, CA (US); Oscar Mitchell, San Diego, CA (US); Richard Keith Ostrom, San Diego, CA (US)

(73) Assignee: GE Security, Inc., Bradenton, FL (US)

( * ) Notice: Subject to any disclaimer, the term of this patent is extended or adjusted under 35 U.S.C. 154(b) by 131 days.

(21) Appl. No.: 11/456,748

(22) Filed: Jul. 11, 2006

(65) Prior Publication Data

US 2008/0012699 A1 Jan. 17, 2008

(51) Int. Cl.
*G01R 27/26* (2006.01)

(52) U.S. Cl. .............. 324/663; 324/662; 324/716; 324/692

(58) Field of Classification Search .......... 324/663, 324/662, 716
See application file for complete search history.

(56) References Cited

U.S. PATENT DOCUMENTS

| | | | | |
|---|---|---|---|---|
| 5,305,390 A | * | 4/1994 | Frey et al. | 382/115 |
| 5,585,575 A | | 12/1996 | Corrigan et al. | |
| 5,600,303 A | | 2/1997 | Husseiny et al. | |
| 5,946,660 A | * | 8/1999 | McCarty et al. | 705/5 |
| 5,956,122 A | | 9/1999 | Doster | |
| 6,073,499 A | | 6/2000 | Settles | |
| 6,119,096 A | * | 9/2000 | Mann et al. | 705/5 |
| 6,375,697 B2 | * | 4/2002 | Davies | 55/340 |
| 6,469,624 B1 | | 10/2002 | Whan et al. | |
| 6,621,414 B2 | * | 9/2003 | Nishikawa et al. | 340/541 |
| 6,870,791 B1 | * | 3/2005 | Caulfield et al. | 367/11 |
| 6,952,163 B2 | * | 10/2005 | Huey et al. | 340/521 |
| 6,965,340 B1 | * | 11/2005 | Baharav et al. | 342/22 |
| 6,970,088 B2 | | 11/2005 | Kovach | |
| 7,047,829 B2 | * | 5/2006 | Napoli | 73/864.31 |
| 7,053,785 B2 | * | 5/2006 | Akins | 340/693.9 |
| 7,091,856 B2 | * | 8/2006 | Tibi et al. | 340/541 |
| 7,119,553 B2 | * | 10/2006 | Yang et al. | 324/663 |

(Continued)

FOREIGN PATENT DOCUMENTS

EP 1182622 A1 2/2002

(Continued)

OTHER PUBLICATIONS

Quantum Magnetics, i-Portal, 2001, web archive, Business Wire, Nov. 1, 2001, p. 12.*

(Continued)

*Primary Examiner*—Timothy J. Dole
*Assistant Examiner*—Thomas F. Valone
(74) *Attorney, Agent, or Firm*—Eugene Hyun, Esq.; Armstrong Teasdale LLP

(57) ABSTRACT

A method of operating a passenger screening kiosk system to perform at least one verify a passenger's identity, detect the presence of an explosive material, and detect the presence of a metallic material includes initiating a prompt to be issued by the passenger screening kiosk system to prompt the passenger to enter the passenger screening kiosk system, prompting the passenger to enter the passenger screening kiosk system, and determining whether the passenger is within the passenger screening kiosk system.

31 Claims, 16 Drawing Sheets

U.S. PATENT DOCUMENTS

| | | | |
|---|---|---|---|
| 7,180,441 B2 * | 2/2007 | Rowe et al. | 342/22 |
| 7,280,042 B2 * | 10/2007 | Trela | 340/539.22 |
| 7,327,137 B1 * | 2/2008 | Crowley et al. | 324/300 |
| 7,365,536 B2 * | 4/2008 | Crowley et al. | 324/300 |
| 7,367,494 B2 * | 5/2008 | Macklin et al. | 235/380 |
| 2001/0011680 A1 | 8/2001 | Soltesz et al. | |
| 2002/0104013 A1 | 8/2002 | Ghazarian | |
| 2004/0222790 A1 * | 11/2004 | Karmi et al. | 324/300 |
| 2005/0024199 A1 | 2/2005 | Huey et al. | |
| 2005/0109843 A1 | 5/2005 | Dove et al. | |
| 2007/0211922 A1 * | 9/2007 | Crowley et al. | 382/115 |
| 2008/0018451 A1 * | 1/2008 | Slibeck et al. | 340/521 |
| 2008/0036592 A1 * | 2/2008 | Barral et al. | 340/540 |

FOREIGN PATENT DOCUMENTS

| | | |
|---|---|---|
| EP | 1411373 A2 | 4/2004 |
| WO | 9828908 | 7/1998 |
| WO | 03052741 A1 | 6/2003 |

OTHER PUBLICATIONS

International Search Report for PCT/US2007/071449; dated Jun. 18, 2007; 4 pages.

* cited by examiner

PASSENGER SCREENING SYSTEM AND METHOD

BACKGROUND OF THE INVENTION

This invention relates generally to personnel screening systems utilized at passenger terminals, and more particularly, to a system configured to improve passenger handling in a transportation terminal and a method of operating the same.

The Transportation Security Administration (TSA) has recently mandated more stringent inspection procedures be implemented by the travel industry to reduce the possibility of passengers boarding a carrier such as a plane, for example, carrying concealed weapons, explosives, or other contraband. To facilitate preventing passengers boarding a plane carrying concealed weapons, explosives, etc., the TSA requires that all passengers be screened prior to boarding the aircraft.

For example, passengers arriving at the airport terminal first submit to a manual verification process that generally includes presenting their boarding pass and a form of identification such as a driver's license or passport, for example, to security personnel. The security personnel then manually verify that the passenger has a valid boarding pass, the name on the identification corresponds to the name on the boarding pass, and that the picture on the license or passport corresponds to the passenger presenting the license and boarding pass to the security personnel. After the manual verification process is completed, the passenger is requested to walk through a metal detector to ensure that the passenger is not carrying any concealed weapons.

While the current passenger screening process is reliable, the process may require additional security personnel to perform the screening procedures. As a result, the cost of implementing an effective security screening process at a transportation terminal is increased. Moreover, the time required to perform the screening process is increased thus necessitating passengers to arrive relatively early to allow the passenger sufficient time to complete the screening process.

BRIEF DESCRIPTION OF THE INVENTION

In one aspect, a method of operating a passenger screening kiosk system to perform at least one verify a passenger's identity, detect the presence of an explosive material, and detect the presence of a metallic material is provided. The method includes initiating a prompt to be issued by the passenger screening kiosk system to prompt the passenger to enter the passenger screening kiosk system, prompting the passenger to enter the passenger screening kiosk system, and determining whether the passenger is within the passenger screening kiosk system.

In another aspect, a passenger screening kiosk system is provided. The system includes an identity verification system, a metal detection system, an explosives detection system, and a computer coupled to the identity verification system, the metal detection system, and the explosives detection system. The computer is configured to prompt a passenger to enter the passenger screening kiosk system, and determine whether the passenger is within the passenger screening kiosk system.

DETAILED DESCRIPTION OF THE INVENTION

Figure 1:
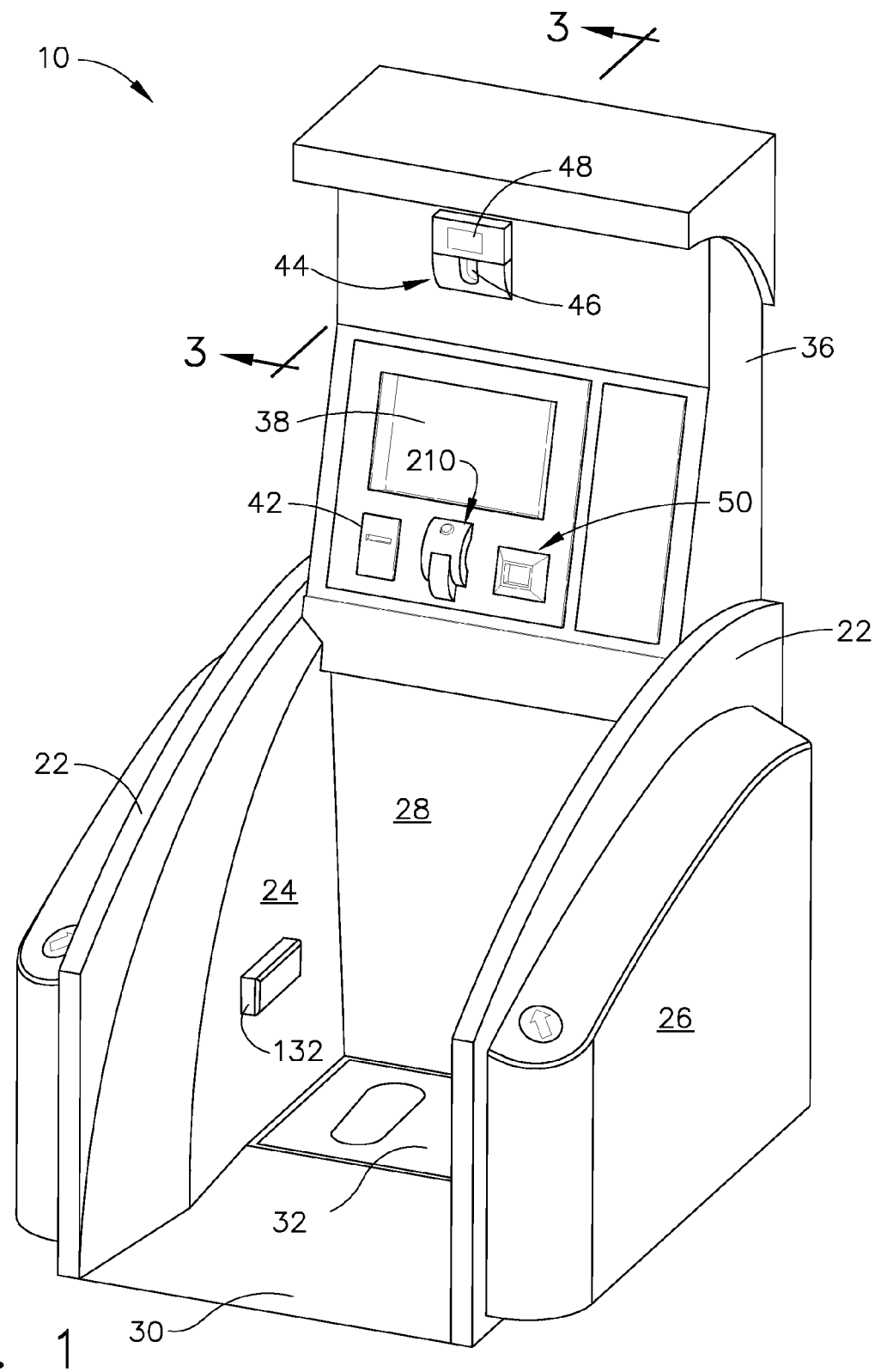
FIG. 1 is a right perspective view of an exemplary kiosk system.
Figure 2:
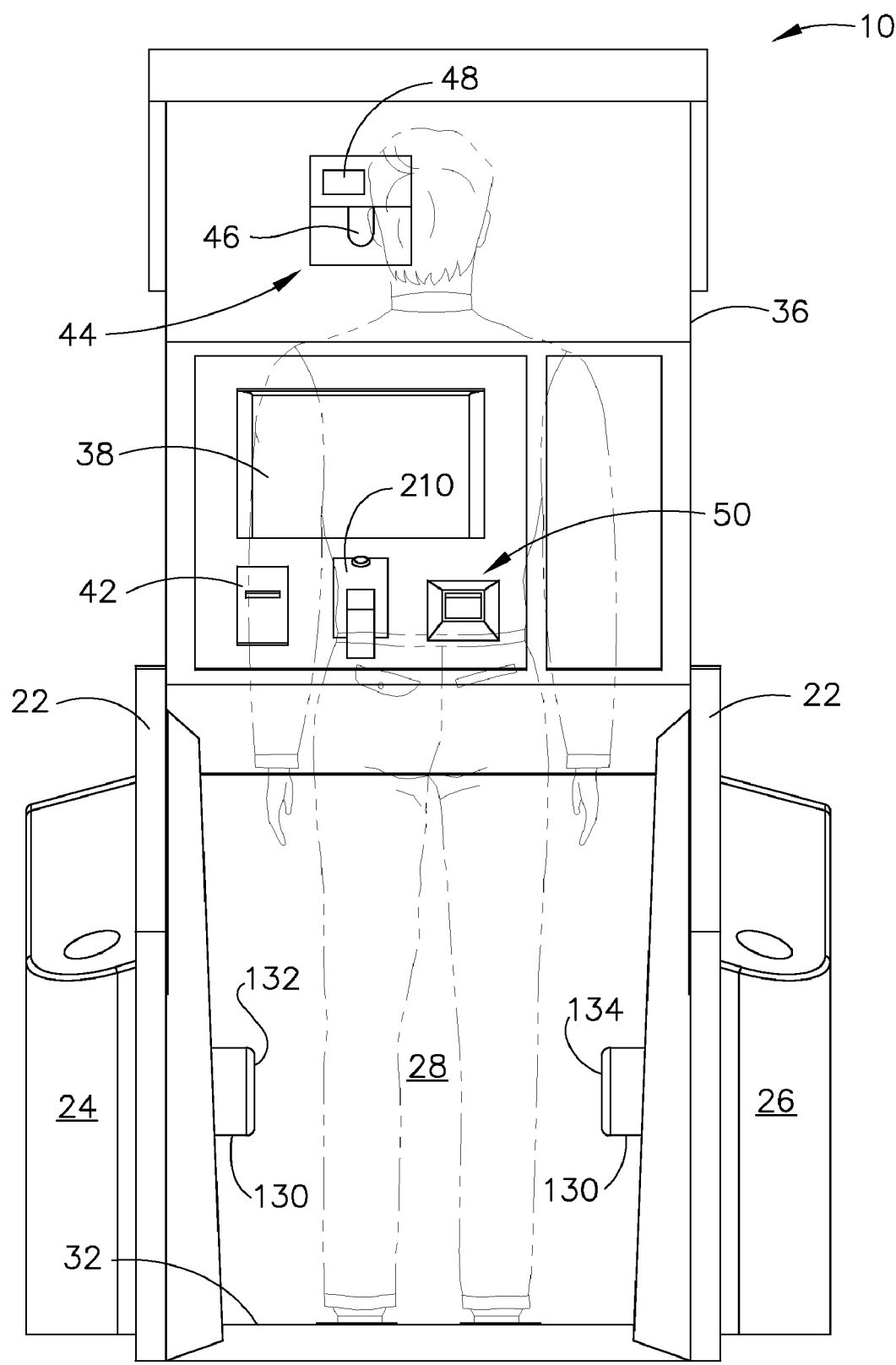
FIG. 2 is a front view of the kiosk system shown in FIG. 1.
Figure 3:
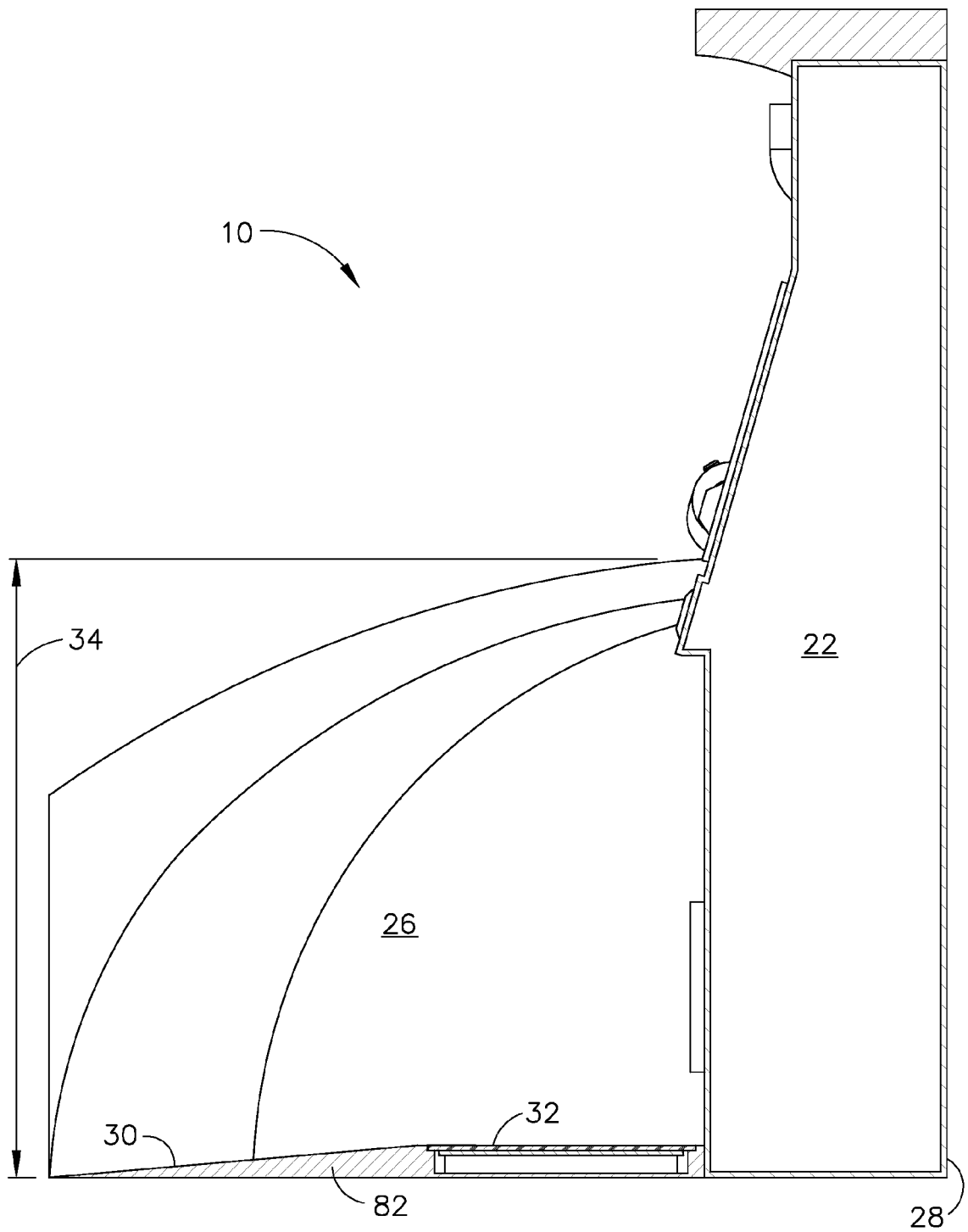
FIG. 3 is a side section view of the kiosk system shown in FIG. 1.
Figure 4:
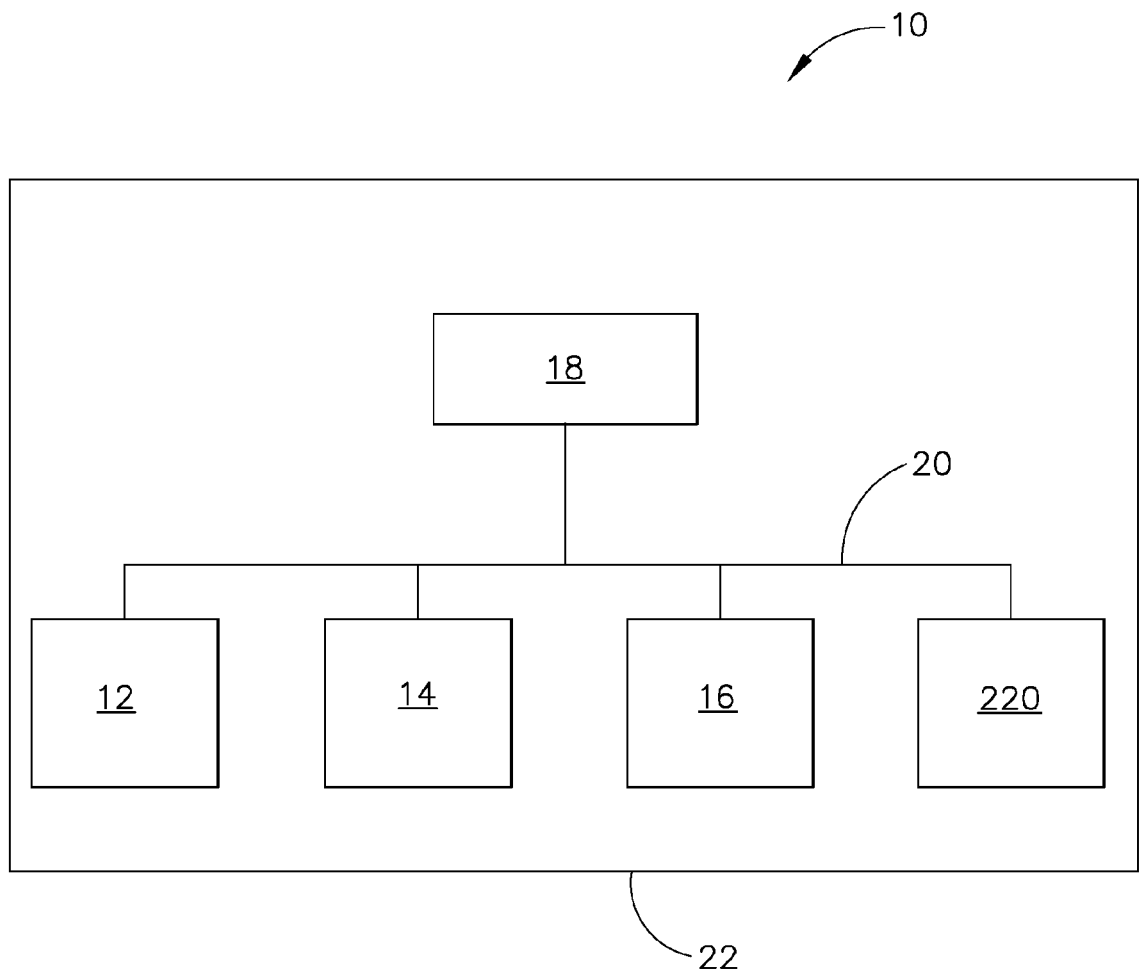
FIG. 4 is a simplified block diagram of an exemplary kiosk security system that includes a first modality and a second modality.

FIG. 1 is a right perspective view of an exemplary passenger screening system 10, FIG. 2 is a front view of the passenger screening system shown in FIG. 1, FIG. 3 is a side section view of the passenger screening system 10 shown in FIG. 1, and FIG. 4 is a simplified schematic illustration of the passenger screening system 10. As shown in FIG. 4, and in the exemplary embodiment, system 10 includes at least a first modality 12 referred to herein as passenger identification verification system 12, a second modality 14 referred to herein as passenger screening system 14, and a third modality 16 referred to herein as a metal detection system 16. System 10 also includes at least one computer 18, and a communications bus 20 that is coupled between modalities 12, 14, and 16, and computer 18 to enable operator commands to be sent to at least one of modalities 12, 14, and 16 and to allow outputs generated by modalities 12, 14, and 16 to be delivered to computer 18 and thus utilized by computer 18 for data analysis or utilized by an operator of computer 18. In one embodiment, modalities 12, 14, and 16 are hardwired to computer 18. In another embodiment, communications bus 20 is a local area network. Optionally, communications bus 20 includes an internet connection.

Modalities 12, 14, and 16 are integrated into a single screening system 10. In the exemplary embodiment, modalities 12, 14, and 16, and computer 18 are each housed within a single kiosk or housing 22. Optionally, computer 18 is housed separately from kiosk 22 and electrically coupled to modalities 12, 14, and 16 utilizing bus 20. As used herein, a kiosk is defined as a relatively small area that is at least partially enclosed by at least one wall. In the exemplary embodiment, the kiosk includes a third, or forward wall, that is coupled between the pair of walls to at least partially enclose the passenger screening area.

Referring again to FIGS. 1-3, kiosk 22 includes a first wall 24, a second wall 26 that is positioned substantially parallel to first wall 24, and a third wall 28 that is positioned substantially perpendicular to and coupled between first and second walls 24 and 26, respectively. Kiosk 22 also includes a floor 30 extending between first, second, and third walls 24, 26, and 28, that, in one exemplary embodiment, includes an inductive sensor unit 32 that is described in further detail below. For example, and as shown in FIGS. 1 and 2, the three walls, 24, 26, and 28 define a single opening such that a passenger may enter and exit kiosk 22 through the same opening. Optionally, kiosk 22 may include two walls 24 and 26 such that the passenger may enter kiosk 22 through a first opening, traverse through kiosk 22, and exit kiosk 22 through a second opening.

In one embodiment, the kiosk walls each have a height 34 of between approximately 28-42 inches. The embodiments of FIGS. 1, 2, and 3 show the left and right walls 24 and 26 formed with an approximate arcuate shape having a radius which approximates the height of the walls. Note that walls 24 and 26 have been optionally truncated at the entrance. Truncating walls 24 and 26 facilitates the movement of people into and out of system 10, and further extends the notion of openness of the screening system. Optionally, kiosk walls 24 and 26 have a height 34 that is greater than a height of a typical passenger, i.e. like a phone booth for example, such that the entire passenger's body may be screened.

In the exemplary embodiment, kiosk 22 also includes a control panel section 36 that is coupled to forward wall 28 and extends upwardly from forward wall 28 to a predetermined height to facilitate providing various operator controls. Control panel section 36 also includes a monitoring or display device 38 that may be utilized to prompt a passenger to either input selected information into the screening system and/or prompt a passenger to perform various actions within the screening system to facilitate the system to expediently verify the identity of the passenger and inspect the passenger for contraband as will be discussed later herein.

In the exemplary embodiment, to facilitate verifying a passenger's identity, system 10 includes a electronic card reader 42 wherein a passenger enters a registration card into a receptacle provided with kiosk 22. In the exemplary embodiment, the passenger registration card includes biometric information of the passenger that has been encoded onto the registration card obtained by the passenger during a pre-screening process. For example, a passenger may obtain a registration card by registering with the Registered Traveler Program wherein a passenger is pre-screened by the TSA or some other authorized screening entity, to obtain biometric information that is then stored on the passenger's registration card. The biometric information may include the passengers fingerprints, iris scan information, hand print information, voice recognition information, or other suitable biometric information. The information on the registration may be encoded on a magnetic strip, use optical read codes, use an RF-read memory chip, or other embedded media.

Accordingly, during operation, the passenger inserts their registration card into electronic card reader 42. Passenger identity verification system 12 then prompts the passenger to position a selected body part on a sensor that is utilized to collect biometric information from the passenger within kiosk 22. The collected information is then compared to the biometric information stored on the registration card to verify the identity of the passenger.

In one exemplary embodiment, passenger identity verification system 12 may be implemented utilizing a iris scan device 44 to generate biometric information that is then compared to the information on the Registered Traveler's registration card in order to verify that the passenger being screened is the passenger to whom the card in fact belongs. In the exemplary embodiment, iris scan device 44 includes an illuminating device 46 that directs light having desired characteristics to the eye under observation such that at least one of the iris and/or pupil of the eye under observation take a characteristic shape. The exemplary iris scan device 44 also includes a light imaging apparatus 48 to generate an image of the iris and/or pupil. The generated image is then compared to information that is stored on the registration card. It should be realized that in the exemplary embodiment, the generated image described herein are computer generated images or data files of an image that are stored within the computer and not physical images. Specifically, the systems described herein generate an electronic image or datafile that is compared to an electronic image or datafile stored on the registration card or optionally within system 10 to verify the identity of the passenger.

In another exemplary embodiment, passenger identity verification system 12 may be implemented utilizing a fingerprint scan device 50 wherein a passenger places a finger on the fingerprint scan device 50 such that the device obtains an image of the fingerprint of the passenger being verified. The generated image is then compared to information that is stored on the registration card or optionally, information stored on computer 18. It should be realized that in the exemplary embodiment, the generated image described herein are computer generated images or data files of an image that are stored within the computer and not physical images. Specifically, the system described herein generate an electronic image or datafile that is compared to an electronic image or datafile stored on the registration card or optionally within system 10 to verify the identity of the passenger. Optionally, the passenger identity verification system 12 may be implemented utilizing a hand scanning device, a facial image recognition system and/or a voice recognition system in order to verify the identity of the passenger.

As discussed above, passenger identity verification systems 12 generally requires a passenger to be prescreened in order to generate the information that is stored within computer 18. For example, passengers may participate in the government's Registered Traveler Program whereby an initial, relatively thorough, screening of the passenger is conducted to generate information about the passenger that may be utilized by system 10 at a later date. As such, the passenger may choose to have a fingerprint scan completed, an iris scan, a hand scan, a voice scan, and/or a facial recognition scan completed. The information collected during the prescreen procedure is then stored within or provided to system 10, e.g. via a card reader reading a registration card, such that when a passenger enters kiosk 22, the verified information may be compared to the information presented by the passenger within kiosk 22 to facilitate reducing the amount of time to complete passenger screening and thus improve the convenience of passenger screening. Moreover, prescreening facilitates shifting limited security resources from lower-risk passengers to passengers that have not be prescreened.

In the exemplary embodiment, passenger screening system 14 may be implemented using a quadrupole resonance (QR) detection system that utilizes quadrupole resonance to detect explosives such as, but not limited to C4, Semtex, Detasheet, TNT, ANFO, and/or HMX since the quadrupole resonance signature of these explosives is unique and measurable in seconds.

Nuclear Quadrupole Resonance (NQR) is a branch of radio frequency spectroscopy that exploits the inherent electrical properties of atomic nuclei and may therefore be utilized to detect a wide variety of potentially explosive materials. For example, nuclei having non-spherical electric charge distributions possess electric quadrupole moments. Quadrupole resonance arises from the interaction of the nuclear quadrupole moment of the nucleus with the local applied electrical field gradients produced by the surrounding atomic environment. Any chemical element's nucleus which has a spin quantum number greater than one half can exhibit quadrupole resonance. Such quadrupolar nuclei include: $^7Li$, $^9Be$, $^{14}N$, $^{17}O$, $^{23}Na$, $^{27}Al$, $^{35}Cl$, $^{37}Cl$, $^{39}K$, $^{55}Mn$, $^{75}As$, $^{79}Br$, $^{81}Br$, $^{127}I$, $^{197}Au$, and $^{209}Bi$. Many substances containing such nuclei, approximately 10,000, have been identified that exhibit quadrupole resonance.

It so happens that some of these quadrupolar nuclei are present in explosive and narcotic materials, among them being $^{14}N$, $^{17}O$, $^{23}Na$, $^{35}Cl$, $^{37}Cl$, and $^{39}K$. The most studied quadrupolar nucleus for explosives and narcotics detection is nitrogen. In solid materials, electrons and atomic nuclei produce electric field gradients. These gradients modify the energy levels of any quadrupolar nuclei, and hence their characteristic transition frequencies. Measurements of these frequencies or relaxation time constants, or both, can indicate not only which nuclei are present but also their chemical environment, or, equivalently, the chemical substance of which they are part.

When an atomic quadrupolar nucleus is within an electric field gradient, variations in the local field associated with the field gradient affect different parts of the nucleus in different ways. The combined forces of these fields cause the quadrupole to experience a torque, which causes it to precess about the electric field gradient. Precessional motion generates an oscillating nuclear magnetic moment. An externally applied radio frequency (RF) magnetic field in phase with the quadrupole's precessional frequency can tip the orientation of the nucleus momentarily. The energy levels are briefly not in equilibrium, and immediately begin to return to equilibrium. As the nuclei return, they produce an RF signal, known as the free induction decay (FID). A pick-up coil detects the signal, which is subsequently amplified by a sensitive receiver to measure its characteristics.

Figure 5:
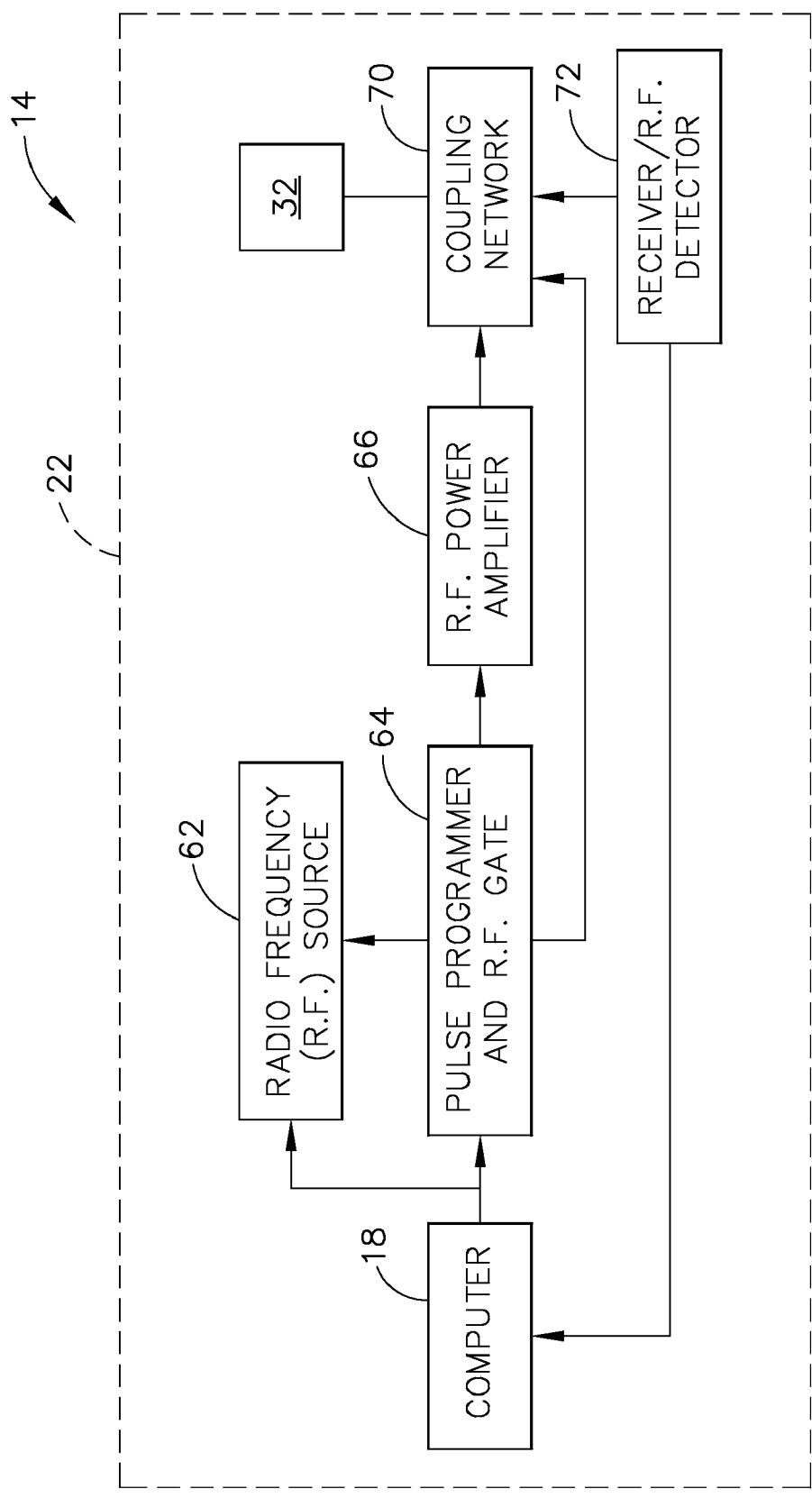
FIG. 5 is a schematic illustration of an exemplary Quadrupole Resonance (QR) screening system that may be utilized with the kiosk shown in FIGS. 1-4.

FIG. 5 is a simplified schematic illustration of an exemplary quadrupole resonance system 14 that includes a radio frequency source 62, a pulse programmer and RF gate 64 and an RF power amplifier 66 that are configured to generate a plurality of radio frequency pulses having a predetermined frequency to be applied to a coil such as sensor 32 (also shown in FIGS. 1-3). A communications network 70 conveys the radio frequency pulses from radio frequency source 62, pulse programmer and RF gate 64 and RF power amplifier 66 to sensor 32 that, in the exemplary embodiment, is positioned within kiosk 22. The communications network 70 also conducts the signal to a receiver/RF detector 72 from sensor 32 after the passenger is irradiated with the radio frequency pulses.

Figure 6:
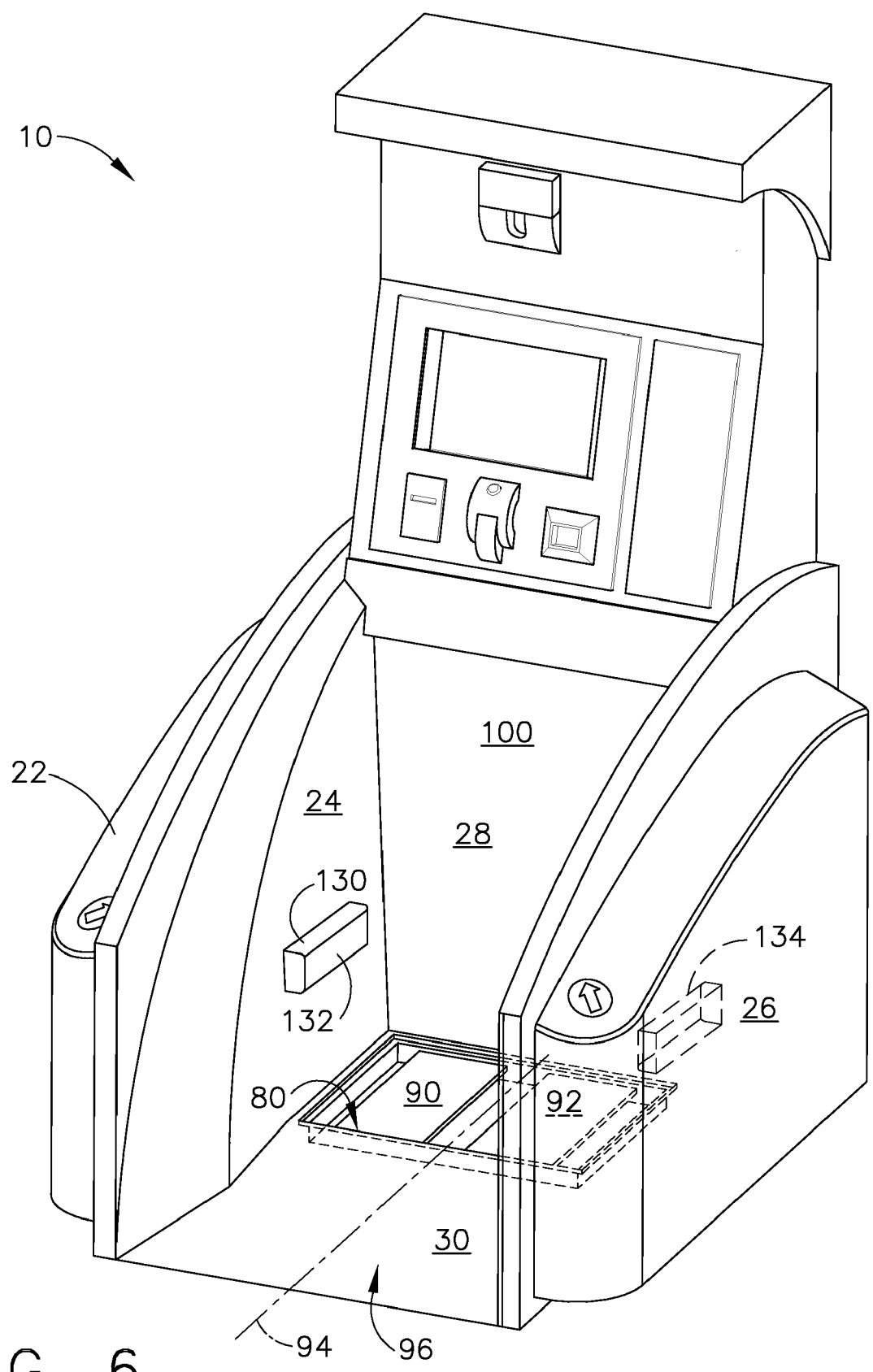
FIG. 6 is a right perspective view of the kiosk shown in FIGS. 1-3 including the screening system shown in FIG. 5.

FIG. 6 is a right perspective view of kiosk 22 including quadrupole resonance (QR) detection system. As stated above, quadrupole resonance (QR) detection system 14 includes an inductive sensor 32 that in the exemplary embodiment, is positioned proximate third wall 28 approximately between first and second walls 24 and 26. In accordance with this embodiment, inductive sensor 32 may be positioned within a recessed region 80 of floor 30, between an entrance ramp 82 and third wall 28. This recessed region 80 may also be referred to as the sensor housing. In FIG. 6, the inductive sensor 32 has been omitted to show sensor housing 80, which is recessed within floor 30.

As shown in FIG. 6, and in the exemplary embodiment, inductive sensor 32 may be implemented using two anti-symmetric current branches 90 and 92 that may be located on opposing sides of a medial plane 94. Specifically, current branch 90 is positioned on one side of medial plane 94, while current branch 92 is positioned on the opposite side of medial plane 94.

Inductive sensor 32 may be configured in such a manner that both current branches 90 and 92 experience current flow that is generally or substantially parallel to the left and right walls 24 and 26. For example, the current branches 90 and 92 may be placed in communication with an electrical source (not shown in this figure). During operation, current flows through current branch 90 in one direction, while current flows through current branch 92 in substantially the opposite direction. The term "anti-symmetric current flow" may be used to refer to the condition in which current flows through the current branches in substantially opposite directions.

In the exemplary embodiment, inductive sensor 32 is implemented using a quadrupole resonance (QR) sensor. For convenience only, various embodiments will be described with reference to the inductive sensor implemented as a QR sensor 32, but such description is equally applicable to other types of inductive sensors.

Figure 7:
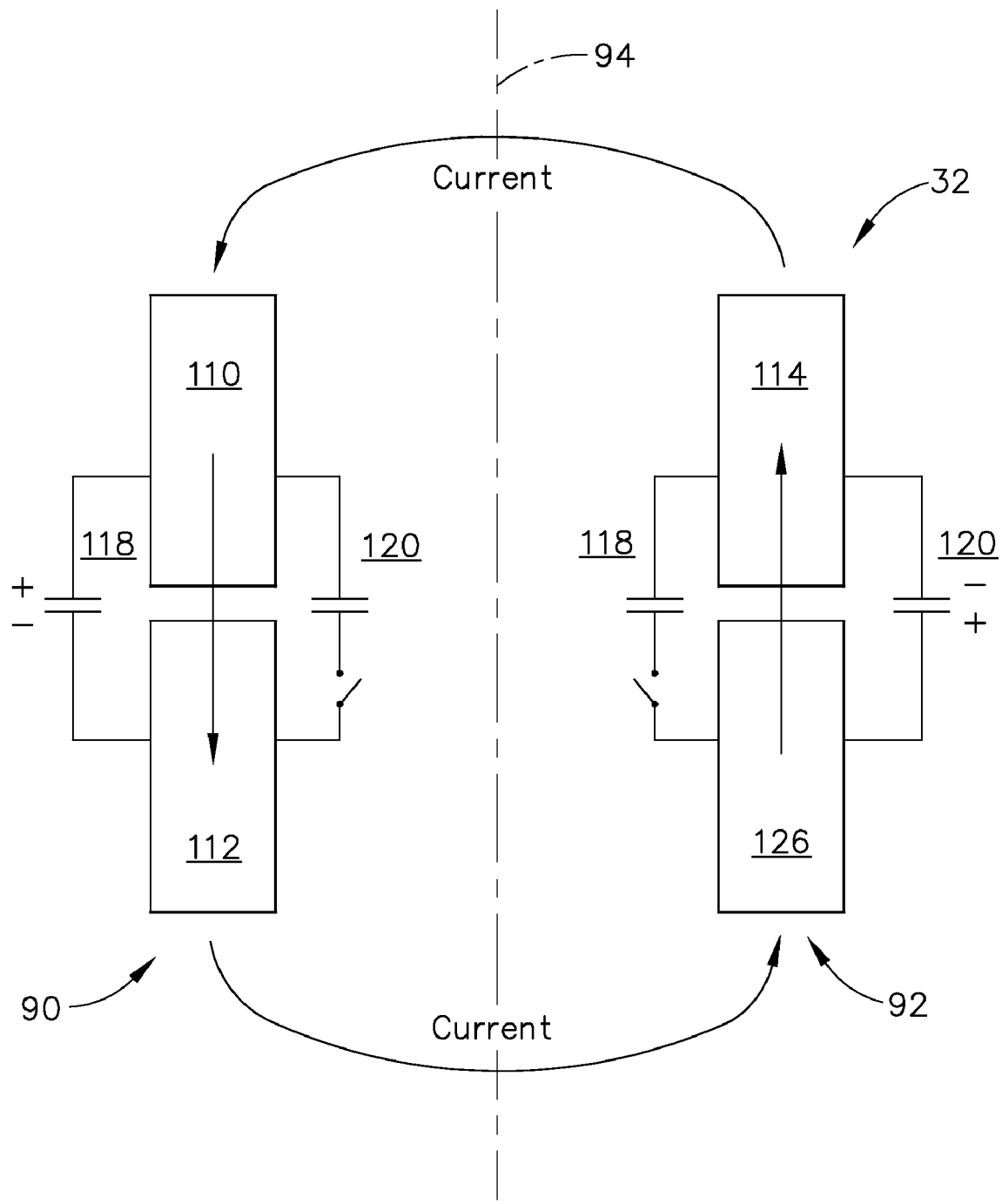
FIG. 7 is a schematic illustration of a portion of the screening system shown in FIG. 6.

In the exemplary embodiment, current branches 90 and 92 collectively define a QR sheet coil that is shown as sensor 32 in FIG. 7. For convenience only, further discussion of the QR sensor will primarily reference a "QR sheet coil," or simply a "QR coil". During a typical screening process, a passenger enters the system at an entrance 96, and then stands within an screening region defined by QR sensor 32. Specifically, the passenger may stand with their left foot positioned relative to current branch 90 and their right foot positioned relative to current branch 92. The QR sensor then performs an screening process using nuclear quadrupole resonance (NQR) to detect the presence of a target substance associated with the passenger.

As shown in FIG. 5, QR sensor 32 is in communication with the RF subsystem, defined generally herein to include radio frequency source 62, pulse programmer and RF gate 64, and RF power amplifier 66 which provides electrical excitation signals to current branches 90 and 92. The RF subsystem may utilize a variable frequency RF source to provide RF excitation signals at a frequency generally corresponding to a predetermined, characteristic NQR frequency of a target substance. During the screening process, the RF excitation signals generated by the RF source may be introduced to the specimen, which may include the shoes, socks, and clothing present on the lower extremities of a passenger standing or otherwise positioned relative to the QR sensor 32. In the exemplary embodiment, the QR coil 32 also functions as a pickup coil for NQR signals generated by the specimen, thus providing an NQR output signal which may be sampled to determine the presence of a target substance, such as an explosive, utilizing computer 18, for example.

In the exemplary embodiment, QR sensor 32 utilizes an EMI/RFI (electromagnetic interference/radio frequency interference) shield to facilitate shielding sensor 32 from external noise, interference and/or to facilitate inhibiting RFI from escaping from the screening system during an screening process. In the exemplary embodiment, walls 24, 26, and 28 are configured to perform RF shielding for QR sensor 32. Specifically, walls 24, 26, and 28 are electrically connected to each other, to entrance ramp 82, and to sensor housing 80 to form an RF shield 100.

Each of the shielding components, i.e. walls 24, 26, and 28 may be fabricated from a suitably conductive material such as aluminum or copper. Typically, the floor components, i.e. ramp 82 and sensor housing 80 are welded together to form a unitary structure. Additionally, walls 24, 26, and 28 may also be welded to the floor components, or secured using suitable fasteners such as bolts, rivets, and/or pins. QR sensor 32 may be secured within sensor housing 80 using, for example, any of the just-mentioned fastening techniques. If desired, walls 24, 26, and 28, entrance ramp 82, and the QR sensor 32 may be covered with non-conductive materials such as wood, plastic, fabric, fiberglass, and the like.

FIG. 7 is a simplified schematic illustration of the exemplary QR sensor 32 shown in FIG. 6. Left current branch 90 is shown having upper and lower conductive elements 110 and 112, which are separated by a non-conductive region. Similarly, right current branch 92 includes upper and lower conductive elements 114 and 116, which are also separated by a non-conductive region. The left and right current branches 90 and 92 collectively define the QR coil of sensor 32, and may be formed from any suitably conductive materials such as copper or aluminum, for example.

No particular length or width for the current branches 90 and 92 is required. In general, each current branch may be dimensioned so that it is slightly larger than the object or specimen being inspected. Generally, current branches 90 and 92 are sized such that a passenger's left foot and right foot (with or without shoes) may be respectively placed in close proximity to the left and right current branches 90 and 92. This may be accomplished by the passenger standing over the left and right current branches. In this scenario, the left and right branches may each have a width of about 4-8 inches and a length of about 12-24 inches. It is to be understood that the terms "left" and "right" are merely used for expositive convenience and are not definitive of particular sides of the structure.

Upper and lower conductive elements 110 and 112 are shown electrically coupled by fixed-valued resonance capacitor 118 and tuning capacitor 120, which is a switched capacitor that is used to vary tuning capacitance. Upper and lower conductive elements 114 and 116 may be similarly configured.

FIG. 7 also includes several arrows which show the direction of current flow through the left and right current branches 90 and 92 which in the exemplary embodiment, is in a counter-clockwise direction. During operation, current flows through left current branch 90 in one direction, while current flows through right current branch 92 in substantially the opposite direction. The reason that current flows through the two current branches in opposite directions is because the left and right current branches 90 and 92 each have a different arrangement of positive and negative conductive elements. For instance, left current branch 90 includes a positive upper conductive element 110 and a negative lower conductive element 112. In contrast, right current branch 92 includes a negative upper conductive element 114 and a positive lower conductive element 116. This arrangement is one example of a QR sensor providing counter-directed or anti-symmetric current flow through the current branches.

In accordance with the exemplary embodiment, current flows between the left and right current branches 90 and 92 during operation since these components are electrically coupled via ramp 82 and the sensor housing 80. During operation, a passenger may place their left foot over left current branch 90 and their right foot over right current branch 92. In such a scenario, current is directed oppositely through each branch resulting in current flowing from toe to heel along left current branch 90, and from heel to toe along right current branch 92. In the exemplary embodiment, QR sensor 32 is positioned within sensor housing 80 to form a non-conductive gap between current branches of the QR sensor. This gap allows the magnetic fields to circulate about their respective current branches.

In contrast to conventional inductive sensor systems, the counter-directed magnetic fields generated by QR sensor 32 are well-attenuated and have a topography that is especially suited for use with a kiosk that includes a first wall 24, a second wall 26 that is opposite to first wall 24, and a third wall 28 that is substantially perpendicular to first and second walls 24 and 26, and a floor 30 that is connected to first wall 24, second wall 26, and third wall 28.

As an example of a practical application, the left and right current branches 90 and 92 may be positioned about 2-7 inches from respective walls 24, 26, and 28 using a plurality of non-conductive regions. In addition, current branches 90 and 92 may be positioned about 4-14 inches from each other using a non-conductive region.

Passenger screening system 14 may also be implemented using a fingertip trace explosive detection system 210 (shown in FIGS. 1 and 2). Fingertip trace explosive detection system 210 is capable of detecting minute particles of interest such as traces of narcotics, explosives, and other contraband on the passenger's finger or hand for example. In the exemplary embodiment, detection system 210 is located proximate to a boarding pass scanner (not shown) such that as the passenger scans the boarding pass, at least a portion of the passenger's hand approximately simultaneously passes over fingertip trace explosive detection system. Optionally, the passenger is prompted to press a button to activate fingertip trace explosive detection system 210 such that trace materials on the finger surface are collected and then analyzed by fingertip trace explosive detection system 210. As such, fingertip trace explosive detection system 10 is configured to determine when a passenger's finger has been placed over the device to activate the fingertip trace explosive screening procedure.

In the exemplary embodiment, fingertip trace explosive detection system 210 includes an ion trap mobility spectrometer (not shown) that is utilized to determine whether any substantially minute particles of interest such as traces of narcotics, explosives, and other contraband is found on the passenger's finger. For example, the ion trap mobility spectrometer is preferentially useful in identifying trace explosives or other contraband on a passenger's finger that may be indicative of the passenger recently manipulating explosives or other contraband and as such does not require imaging or localization.

In the exemplary embodiment, and referring again to FIGS. 1 and 2, modality 16, i.e. the metal detection system 16 may be implemented utilizing a pair metal detection coils 130 that are utilized in conjunction with inductive sensor 32. Each of the metal detection coils 130 may be configured to detect conductive objects present within the vicinity of the lower extremities of the inspected passenger. These signals may be communicated to a suitable computing device for example computer 18. More specifically, and as shown in FIG. 6, modality 16 includes a first metal detection coil 132 and a second metal detection coil 134 that are each mounted to a side of kiosk 22.

Specifically, first metal detection coil 132 is mounted to an inner surface of first wall 24 and second metal detection coil 134 is mounted to an inner surface of second wall 26. In the exemplary embodiment, metal detection coils 132 and 134 are each mounted at a height above floor 30 to is most advantageous to conduct a metal detection screening of the lower extremities of the passenger. For example, coils 132 and 134 may be positioned approximately 12-40 inches above floor 30. In the exemplary embodiment, metal detection coils 132 and 134 are inductive coils such that when a first current flows through the first metal detection coil 132 in a first direction a first magnetic field is formed, and when the current flows through the second metal detection coil, in a second opposite direction, a second magnetic field is formed.

Figure 8:
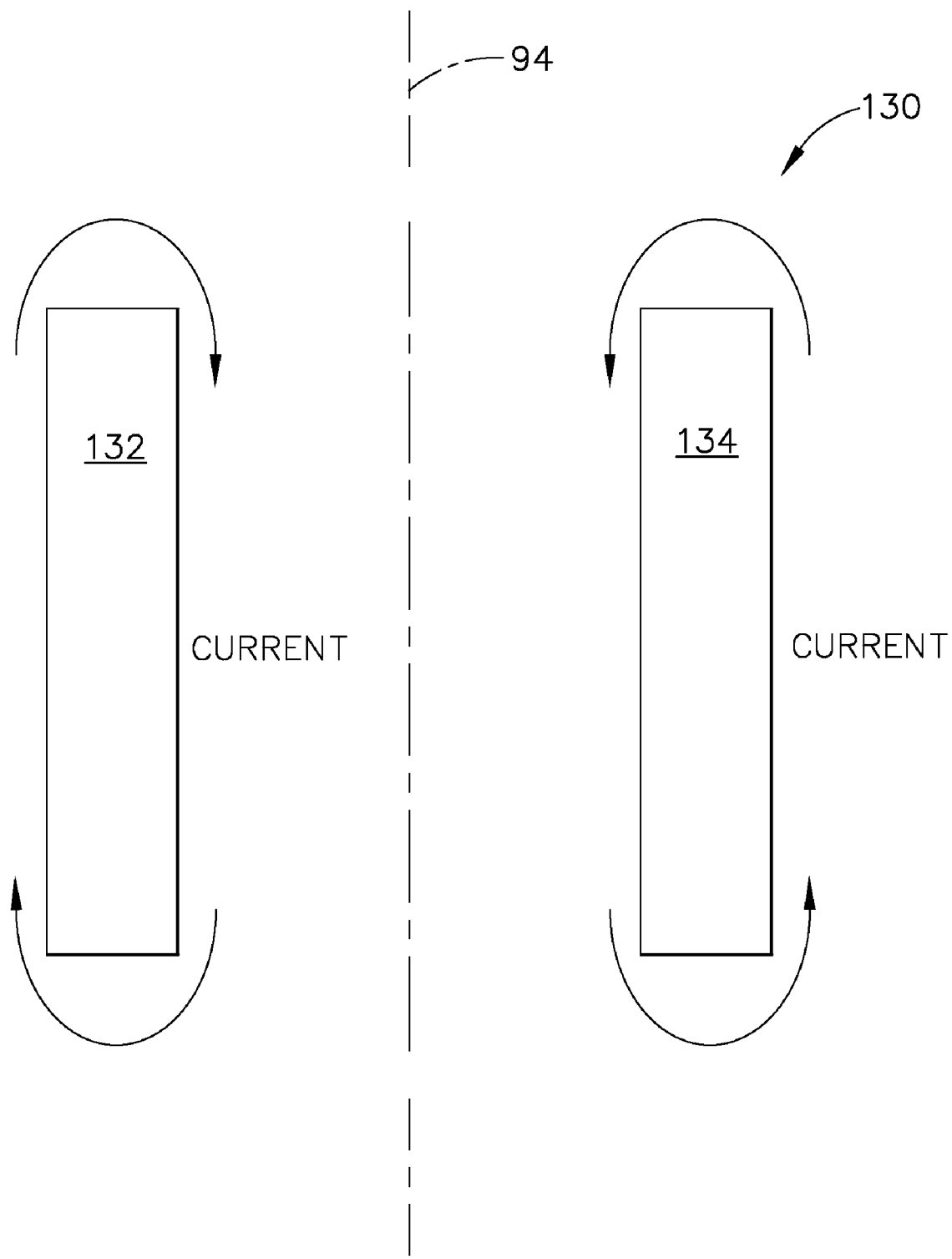
FIG. 8 is a schematic illustration of a portion of the screening system shown in FIG. 6.

FIG. 8 is a simplified schematic illustration of the metal detection coils 132 and 134 shown in FIG. 6. Coil 132 and coil 134 are each separated by a non-conductive region 136 which generally is the utilized for the passenger, i.e. the passenger is positioned between coils 132 and 134 to facilitate operation of the system. Coils 132 and 134 may be formed from any suitably conductive materials such as copper or aluminum, for example, and no particular length or width for the coils 132 and 134 is required. In general, each coil is dimensioned so that it is slightly larger than the object or specimen being inspected. It is to be understood that the terms "left" and "right" are merely used for expositive convenience and are not definitive of particular sides of the structure.

FIG. 8 also includes several arrows which show the direction of current flow through the left and right coils 132 and 134 which in the exemplary embodiment, is in a clockwise direction through coil 132 and in a counterclockwise direction through coil 134 such that there is no mutual inductance between the inductive sensor 32 (shown in FIG. 7) the coil pair 130 and 132. Although, an exemplary metal detection coil 130 is described herein, it should be realized that a wide variety of coils types may be utilized.

More specifically, current is supplied to coils 132 and 134 utilizing a line driver circuit or a signal driver, for example, such that each coil 132 and 134 generates a magnetic field around each respective coil. In the exemplary embodiment, the QR sensors 32 are utilized to monitor or detect any changes in the magnetic field generated by coils 132 and 134. More specifically, when no metallic object is positioned between coils 132 and 134, the coils are substantially balanced. That is, a balanced or null signal is injected into the QR sensors 32 such that QR sensors 32 do not detect any imbalance between coils 132 and 134. However, if a passenger, carrying a metallic object is positioned between coils 132 and 134, the signals generated by coils 132 and 134 will become unbalanced, i.e. a signal having some amplitude, will be detected by QR sensor 32. Accordingly, when system 10 is configured to operate modality 14, i.e. the metal detection modality, QR sensors 32 are electromagnetically the QR driver circuit to enable the QR sensors 32 to detect any disturbances in the magnetic field generated by coils 132 and 134.

In the exemplary, embodiment, metal detection coils 132 and 134 are each calibrated to ensure that they are substantially in balance, i.e. produce a magnetic field of similar strength, when no metallic object is positioned between them. Moreover, QR sensor 32 is calibrated to identify and changes in the magnetic field generated by coils 132 and 134. As such, and in the exemplary embodiment, QR sensor 32 is utilized to detect any changes in the magnetic fields generated by coils 132 and 134. In the exemplary embodiment, when the QR sensors detects a change in the magnetic fields generated by coils 132 and 134 has exceeded a predetermined threshold, an alarm or other indication will be enabled to prompt an operator that a metallic object has been detected and further, more detailed screening of the passenger may be required.

Although the exemplary metal detection system 16 described herein is generally is directed toward scanning the lower region of the passenger while the passenger is still wearing shoes, it should be realized that system 16 may be implemented to scan the entire passenger with or without the passenger wearing shoes.

Figure 9:
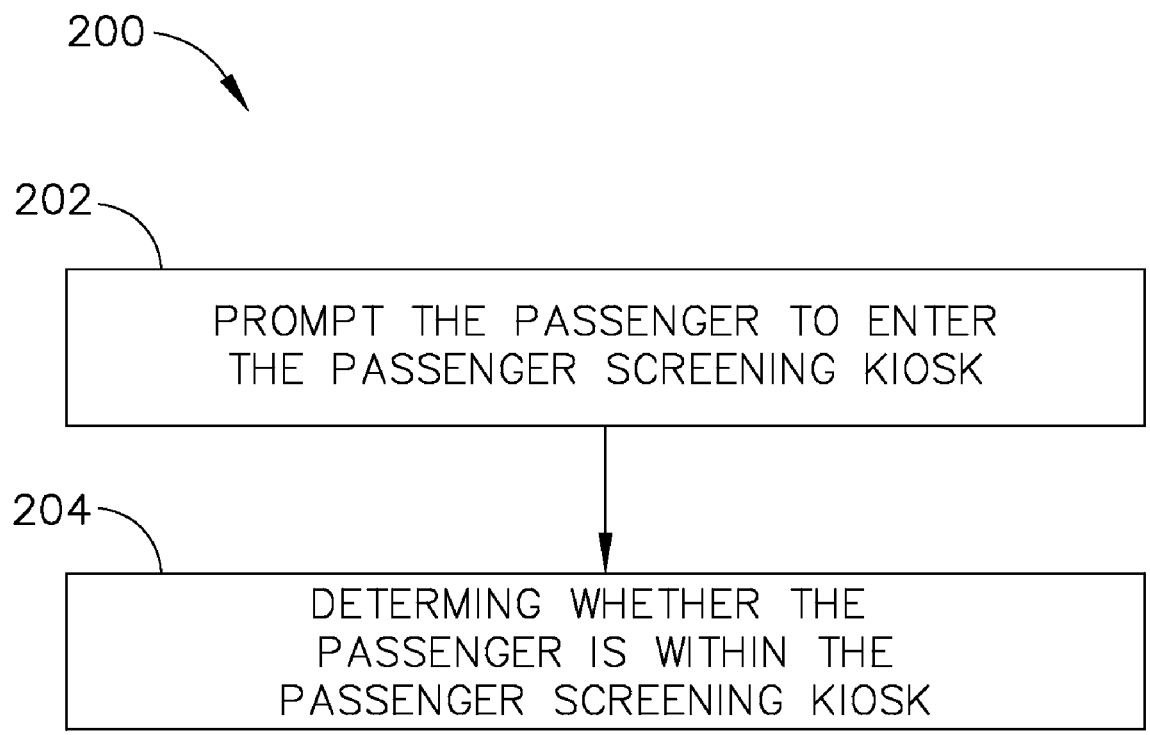
FIG. 9 is a flowchart illustrating an exemplary method of operating the screening system shown in FIGS. 1-8.

FIG. 9 is a flow diagram of an exemplary method 200 of operating screening system 10 to verify the identity of a passenger and detect the presence of at least one of an explosive material and a metallic material. Method 200 includes prompting 202 the passenger to enter the passenger screening kiosk, and determining 204 whether the passenger is within the passenger screening kiosk system.

As discussed above, to optimize the identification and screening operation of system 10, the passenger being inspected should be positioned within system 10 such that the passenger's feet are positioned within a predetermined screening area the provides the most optimal screening conditions for both the first and second screening modalities. However, as discussed above, the passenger to be screened is generally unaware of the most optimal screening area. As a result, system 10 also includes a means that may be utilized to determine that the passengers feet are within the predetermined area.

More specifically, the volume of space interrogated by the QR coils and the metal detection system is finite, and as such, a means 220 is provided to ensure that the passenger's feet remain within the interrogation volume, i.e. the predetermined screening area, throughout the scan period. Moreover, the metallic detection system 16 generally relies on the similarity of metallic parts in shoes and on the presence of a weapon spoiling the symmetry of the metal distribution between the two feet. As such, to optimize the performance of system 10, the two feet should be placed nearly symmetrically over the QR coils and between the metal detection coils in order that misplacement not generate a false asymmetry alarm. To accomplish this, system 10 includes at least one additional system or means 220 that is utilized to determine the placement of each foot within the inspection system 10.

Figure 10:
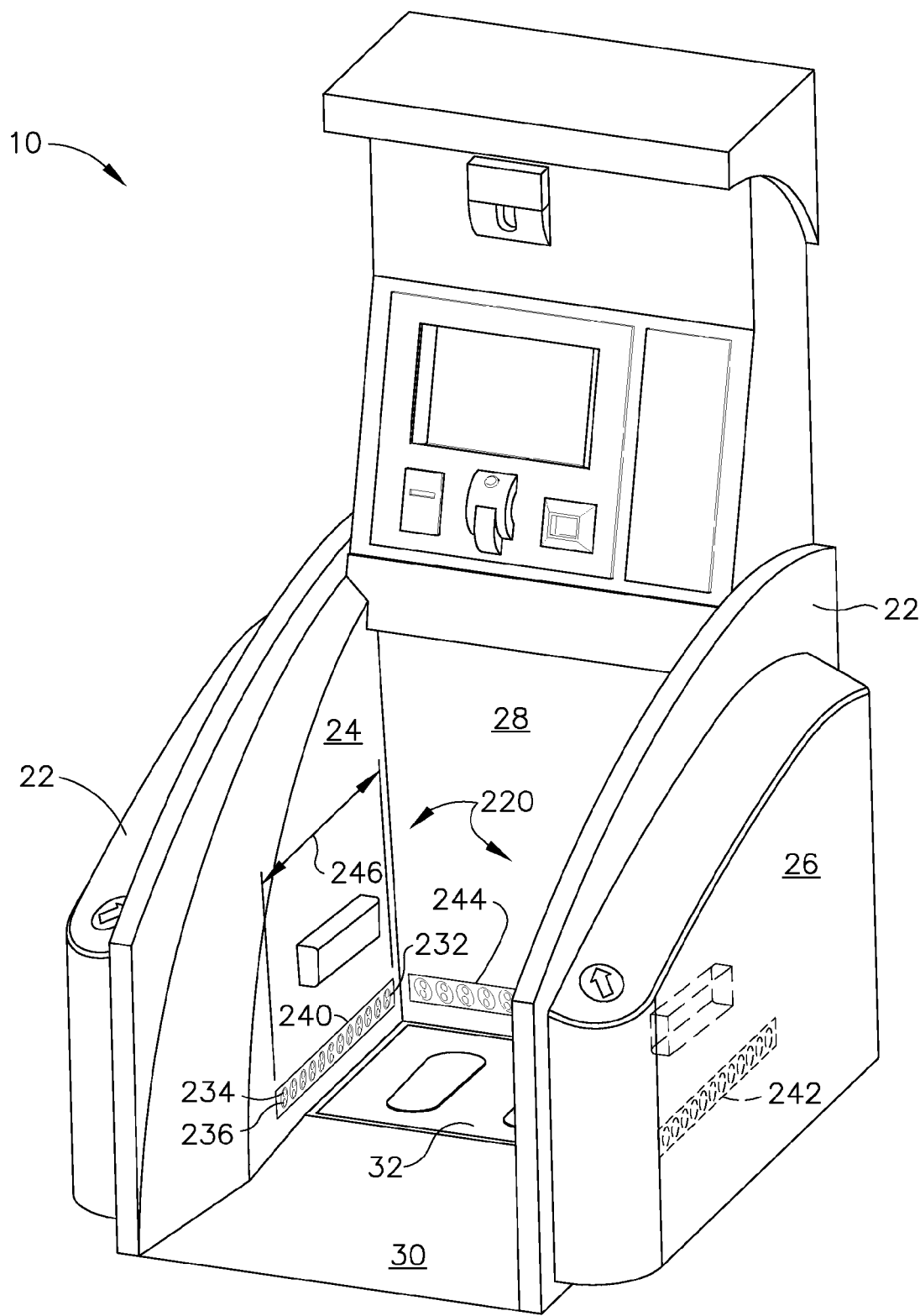
FIG. 10 is a front view of the kiosk shown in FIGS. 1-8 including an exemplary system that may be utilized to determine the passenger's feet position within the kiosk.

FIG. 10 is a front view of screening system 10 including a means 220 that may be utilized to determine whether the passenger's feet are positioned within a predetermined screening area within system 10. In this exemplary embodiment, means 220 may be implemented utilizing an infrared imaging system 230 that includes a first infrared sensor array 230 that includes a plurality of sensors 232 wherein each infrared sensor includes an infrared transmitter 234 and an infrared receiver 236 that are each utilized to determine the distance between at least one of the passenger's feet and the infrared sensor array 230. Specifically, and in the exemplary embodiment, the sensor array 230 is fabricated such an infrared transmitter 234 is mounted proximate to a respective infrared receiver 236 and facing the same direction, such that when an object, such as the passenger being screened, is positioned in the path of the transmitter 234, the infrared beam is be reflected from the passenger being screened back to the receiver 236. In the exemplary embodiment, the receiver 236 generates a voltage output that is proportional to the distance to the object that is reflecting the beam.

In the exemplary embodiment, system 230 includes a first sensor array 240 that is positioned on wall 24 and directed inwardly toward the screening area defined between walls 24 and 26, and a second sensor array 242 that is positioned on wall 26 and directed inwardly toward the screening area, i.e. toward the first sensor array 240, and a third sensor array 244 that is positioned on wall 28. In the exemplary embodiment, sensors 232 are each spaced linearly such that the sensors 232 are approximately parallel to floor 30. Additionally, the sensors 232 within each sensor array 240 and 242, respectively are spaced approximately one inch apart, and the arrays are fabricated to include a predetermined length 246 that is equivalent to or slightly larger than a predetermined foot size of an average passenger to be screened.

During operation of system 230, when a foot is placed near each respective sensor array 240, 242, and 244, each respective sensor 232 generates a distance measurement between the part of the side of the foot that is in line with that respective sensor 132. Specifically, each sensor array utilizes an angulation technique to determine the distance between each respective foot and the sensor arrays. This information is then utilized to generate a distance profile of the portion of the passengers foot that is proximate to each respective sensor array 240, 242, and 244. As a result, the distance profile will substantially match a profile of the passenger's foot being screened. Utilizing the distance profile generated by each respective sensor array 240, 242, and 244, a computer, such as computer 18 for example, determines at least one of the length of the foot, the distance from the foot to each respective sensor array 240, 242, and 244, the position of the foot along each respective sensor array 240, 242, and 244, and the angle of the foot with respect to each respective sensor array 240, 242, and 244. Moreover, the distance profile may also be utilized to estimate the width of the foot from the determined foot length. Although, the term "foot" is utilized throughout the description, it should be realized that the term foot generally refers to the passenger's foot and the footwear worn by the passenger during the screening process.

The distance profile is then utilized to calculate the region of the floor 30 that is covered by the foot. The calculated region is then compared to the acceptable foot placement region, i.e. the predetermined screening area, to determine whether the passenger's feet are properly within the predetermined screening area. If the foot is within the acceptable region, then modality 12 is initiated to perform an explosives screening of the passenger. Optionally, if the foot is not within the acceptable region, the passenger is prompted to reposition either one or both feet. System 230 is then activated to generate an additional distance profile as discussed above. This process is completed until both feet are positioned within the predetermined screening area and the explosive scan is completed. In the exemplary embodiment, the passenger may be prompted to reposition one or both feet utilizing either an audio or visual indicator, generated and displayed on computer 18, for example. In the exemplary embodiment, system 230 may include additional sensors 232 that are mounted proximate to, or slightly above floor 30 to facilitate the detection of narrow high heeled shoes and thus improve the screening process.

Figure 11:
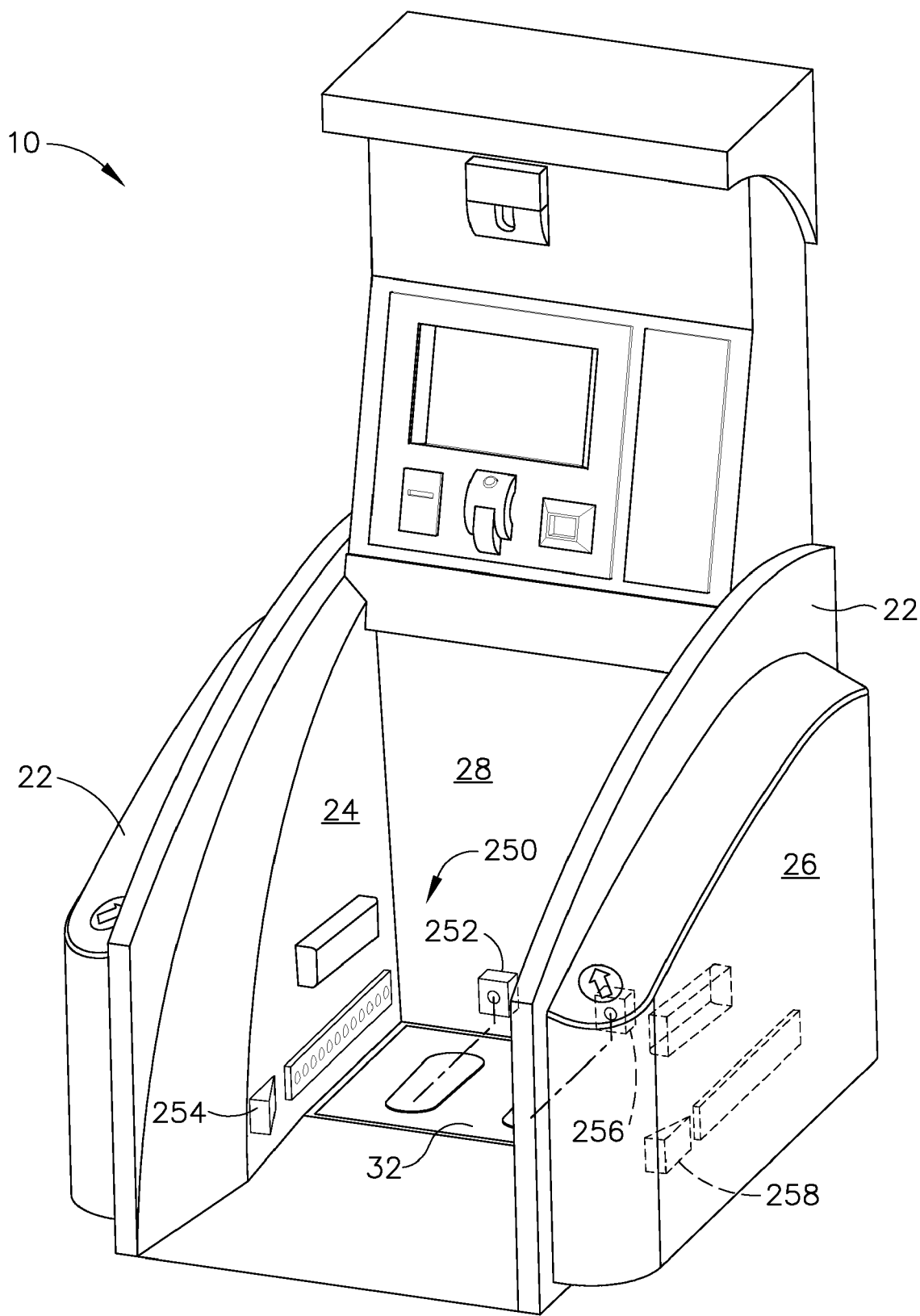
FIG. 11 is a front view of the kiosk shown in FIGS. 1-8 including another exemplary system that may be utilized to determine the passenger's feet position within the kiosk.

FIG. 11 is a front view of screening system 10 including an exemplary system 250 that may be utilized to determine whether the passenger's feet are positioned within a predetermined screening area within system 10. In this exemplary embodiment, means 220 is implemented utilizing a machine vision system 250 that includes a first camera 252, a second camera 254, a third camera 256, and a fourth camera 258. In the exemplary embodiment, first and second cameras 252 and 254, are mounted proximate to the left wall 24 such that the first camera 252 is positioned to image the forward part of the passenger's left foot, and the second camera 254 is positioned to image the rearward, or heel portion, of the left passenger's foot. Additionally, third and fourth cameras 256 and 258, are mounted proximate to the right wall 26 such that the third camera 256 is positioned to image the forward part of the passenger's right foot, and the fourth camera 258 is positioned to image the rearward, or heel portion, of the passenger's right foot.

In operation, utilizing two cameras to image both the left and right foot facilitates generating a three-dimensional image of the foot region. More specifically, the three-dimensional representation may not be a physical representation, rather in the exemplary embodiment, computer 18 utilizes the images generated by each camera to analyze, in three dimensions, the proper placement of each foot within the predetermined screening area. If system 250 determines that both feet are properly positioned within the predetermined screening area, at least one of an explosive scan or a metal detection scan is completed.

As such, system 250 facilitates utilizing two cameras to view a particular feature of the respective foot or shoe region to determine a three-dimensional position of that feature. Accordingly, cameras 252, 254, 256, and 258 facilitate determining when each foot is in the correct position in the plane of the floor also determine whether the foot or shoe is being lifted off the floor. In the exemplary embodiment, computer 18 utilizes and image processing algorithm to determine the shoe type which enables or alerts security personal of potential problem shoe types which may not be suitable for this type of explosive scan.

Figure 12:
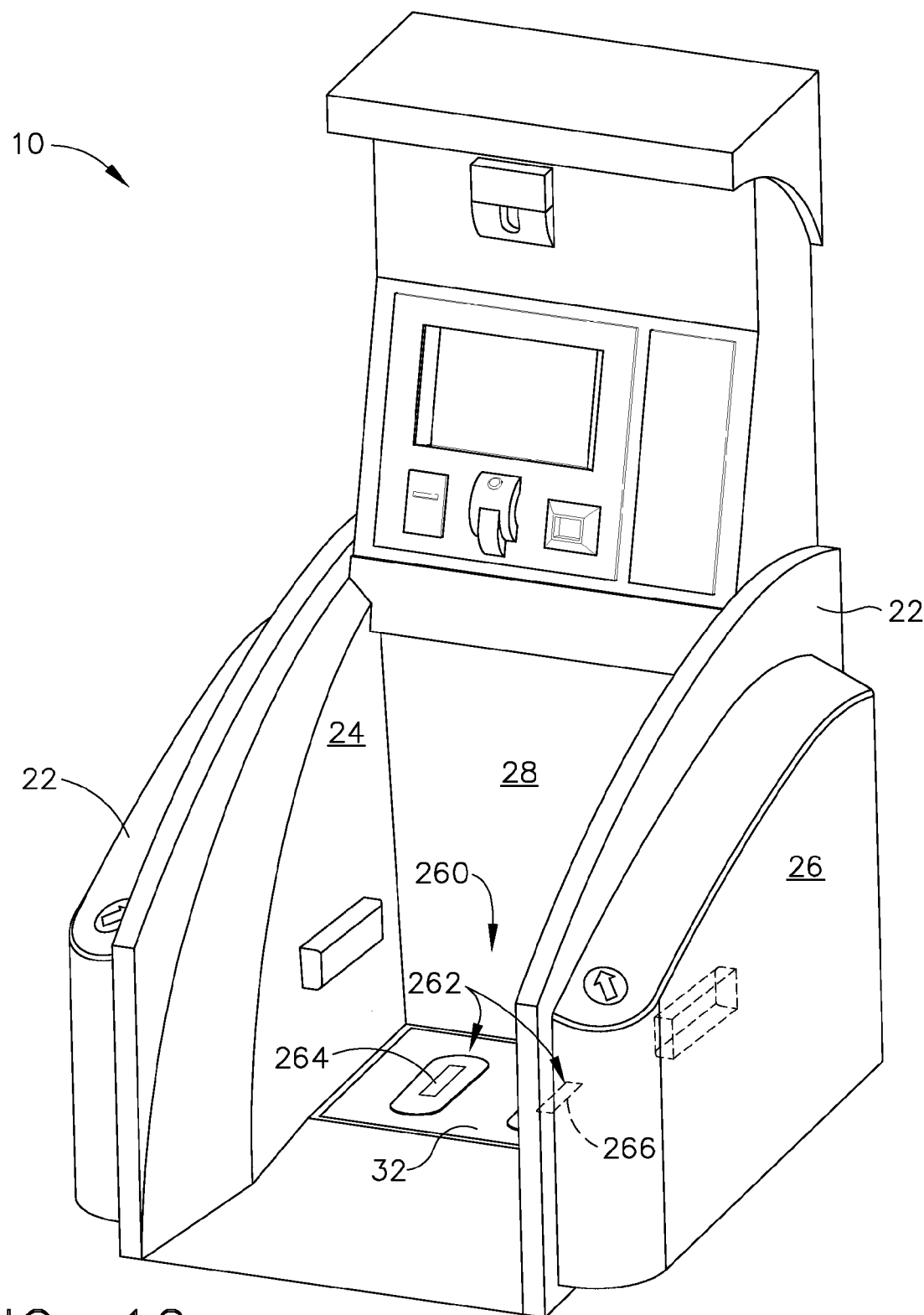
FIG. 12 is a front view of the kiosk shown in FIGS. 1-8 including another exemplary system that may be utilized to determine the passenger's feet position within the kiosk.

FIG. 12 is a front view of screening system 10 including an exemplary system 260 that may be utilized to determine whether the passenger's feet are positioned within a predetermined screening area within system 10. In this exemplary embodiment, means 220 is implemented utilizing a pressure responsive system 260 that includes a pair of pressure switches 262 that are mounted within floor 30. In the exemplary embodiment, a first and a second pressure switch are each mounted in or proximate to floor 30 such that the pair of pressure switches 262 are activated by the passenger being screened when the passenger's feet are each positioned within the predetermined screening area such that at least one of an explosive scan or a metal detection scan may be completed. In a particular embodiment, pressure responsive system 260 includes a first pressure sensor 264 and a second pressure sensor 266, as shown in FIG. 12. First pressure sensor 264 and second pressure sensor 266 are each configured to activate when depressed by a passenger's foot. As such, first pressure sensor 264 is configured to activate when depressed by a first foot, and second pressure sensor 266 is configured to activate when depressed by a second foot. Further, if both sensors 264, 266 are not activated, the passenger is prompted to reposition both feet such that each foot activates a respective pressure sensor 264, 266. After the passppger's feet are properly positioned and first pressure sensor 264 and second pressure sensor 266 are both activated, at least a portion of the passenger is scanned to detect the presence of at least one of an explosive material and a metallic material. Accordingly, the passenger is prompted to reposition both feet such that the first foot activates first pressure sensor 264 and the second foot activates second pressure sensor 266.

Figure 13:
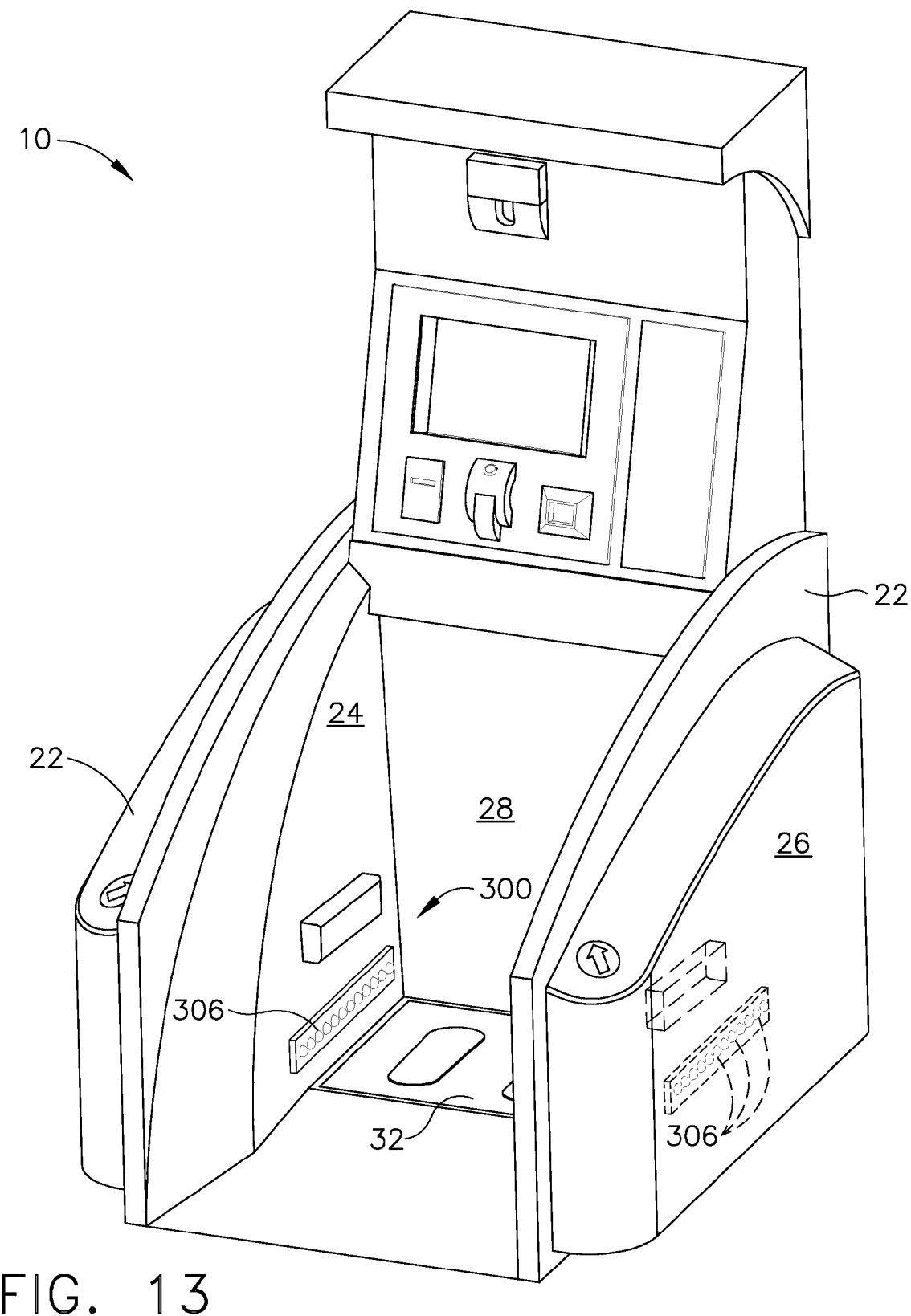
FIG. 13 is a front view of the kiosk shown in FIGS. 1-8 including another exemplary system that may be utilized to determine the passenger's feet position within the kiosk.
Figure 14:
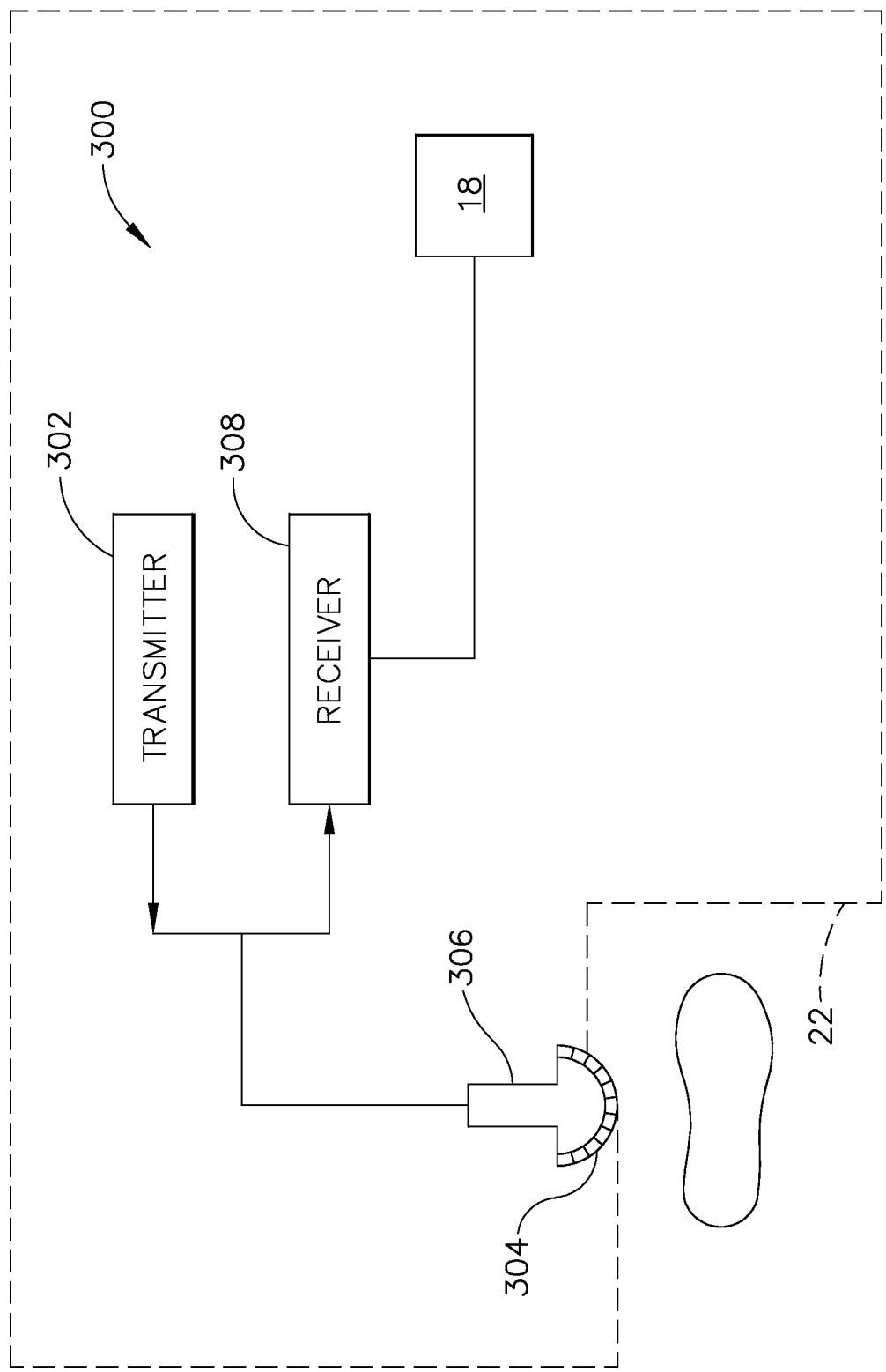
FIG. 14 is a schematic illustration of the system shown in FIG. 13 during a second mode of operation.

FIG. 13 is a front view of screening system 10 including an exemplary system 300 that may be utilized to determine whether the passenger's feet are positioned within a predetermined screening area within system 10. FIG. 14 is a schematic illustration of the exemplary system 300 shown in FIG. 13. In this exemplary embodiment, means 220 is implemented utilizing an ultrasonic ranging system 300 that includes a transmitter 302 that drives transducer elements 304 within a probe 306 to emit pulsed ultrasonic signals toward the passenger being screened. A variety of geometries may be used. The ultrasonic signals are back-scattered from structures within the body or preferably from metallic or explosive objects concealed on the passenger, to produce echoes that return to transducer elements 304. The echoes are received by a receiver 308. A user input device, such as computer 18 for example, may be used to control operation of ultrasonic ranging system 300 and to process the acquired ultrasound information.

During operation of system 300, when a foot is placed near each respective probe 306, the transmitter 302 is activated to emit ultrasonic radiation toward the passenger being screened. The reflected or backscattered radiation is detected by each respective receiver 308 and computer 18 is utilized to generate a distance measurement between the part of the side of the foot that is in line with that respective probe 306. Specifically, the round trip time interval from the ultrasonic wave is emitted and received by probe 306 is calculated for each respective probe 306. This information is then utilized to generate a distance profile of the portion of the passenger's foot that is proximate to each respective probe 306. As a result, the distance profile will substantially match a profile of the passenger's foot being screened. The distance profile is then utilized by system 10 as described above to determine the proper position of the passenger's feet within system 10.

Figure 15:
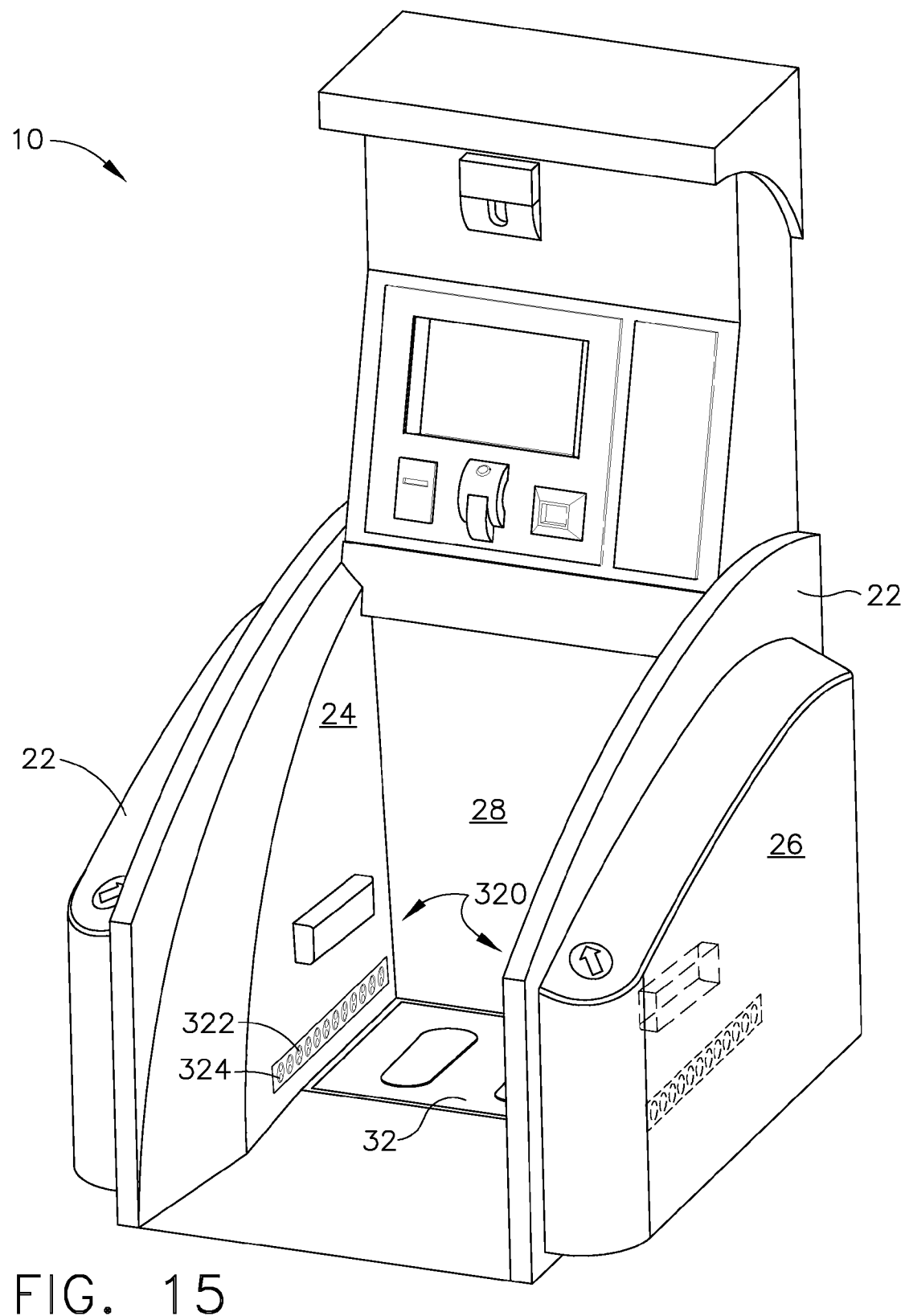
FIG. 15 is a front view of the kiosk shown in FIGS. 1-8 including another exemplary system that may be utilized to determine the passenger's feet position within the kiosk.

FIG. 15 is a front view of screening system 10 including an exemplary system 320 that may be utilized to determine whether the passenger's feet are positioned within a predetermined screening area within system 10. In this exemplary embodiment, means 220 is implemented utilizing a rastered laser ranging system 320 that includes a plurality of laser emitters 322 each having a respective light receiving device 324. In the exemplary embodiment, the rastered laser imaging system 320 is positioned and utilized similar to system 300 discussed previously herein.

Described herein is a kiosk that is configured to optimize passenger handling into and out of the passenger screening kiosk 22, and moreover, to control the actions of the passenger within the kiosk to facilitate reducing the time required to perform passenger identification and the various screening for both metal detection and explosives and/or contraband detection.

As such, the kiosk includes a modality utilized to perform explosives and or drug detection, a second modality that is utilized to perform metal detection, a third modality that is utilized to verify the identity of the passenger within the kiosk, and a means to ensure that that the passenger's feet are positioned properly within the kiosk to facilitate improving the accuracy of the first and second screening modalities.

Specifically, the kiosk discussed herein is utilized to enhance passenger movement through a screening portion of a travel terminal, such as for example, an airport terminal. To accomplish this, a passenger is prompted to enter kiosk 22. In one embodiment, kiosk 22 is configured to generate an indication that the kiosk is available to perform screening, for example, computer 18 may generate a visual "ENTER" indication that may be viewed by the passenger on display 38. Optionally, local security personnel may prompt a passenger to enter kiosk 22. As such, kiosk 22 includes a sensor that is utilized to determine when a passenger has entered kiosk 22. For example, in one embodiment, system 10 is configured to automatically determine when a passenger has entered kiosk 22 utilizing a pressure sensor installed within floor 30 or a photodetector 390 (shown in FIG. 17), for example. As such, when a passenger has entered kiosk 22, the photodetector 390 or pressure sensor will activate to provide computer 18 an indication that a passenger is within kiosk 22.

After system 10 has determined that a passenger to be inspected is within kiosk 22, system 10 may then prompts the passenger to enter identity information. For example, as discussed above, kiosk 22 may request that a passenger enter a registration card having the passenger's previously verified biometric information into the electronic card reader 42. System 10 then automatically prompts the passenger to place a body part onto one of the identity verification systems. For example, system 10 may prompt the passenger to place at least one eye in front of the iris scan device 44. System 10 then determines whether the passenger's eye is positioned in front of the iris scan device 44 and automatically initiates scanning the passenger's eye to produce an image of the iris as discussed above. The generated image is then compared to the biometric information stored on the passenger's registration card to verify the identity of the passenger.

In another embodiment, system 10 automatically prompts the passenger to place a finger on the fingerprint scan device 50. System 10 then determines whether the passenger's finger is positioned on the fingerprint scan device 50 and automatically initiates scanning the passenger's finger to produce an image of the iris as discussed above. The generated image is then compared to the biometric information stored on the passenger's registration card to verify the identity of the passenger.

After the identity of the passenger has been determined, system 10 then prompts a passenger to perform an explosives detection search. For example, system 10 may prompt the passenger to press their thumb on the fingertip trace explosive detection system 210. In the exemplary embodiment, system 210 is configured to determined whether the passenger's finger is positioned on system 21- and automatically initiate a trace explosives scan on the fingertip of the passenger within kiosk 22 in a relatively short time period, thus decreasing the time required to inspect a passenger for explosives.

To facilitate performing either a metal scan or an explosives scanning procedure of the lower leg and feet region of the passenger, system 10 is configured to automatically prompt the passenger to correctly position their feet within kiosk 22.

Specifically, system 10 first prompts the passenger to position their feet within the predetermined scanning area as discussed above. System 10 then determines the relative location of a passenger's feet within the screening system to verify that the passenger's feet are positioned within the predetermined screening area. In the exemplary embodiment, the position of the passenger's feet within kiosk 22 is determined utilizing means 220 described above.

Figure 16:
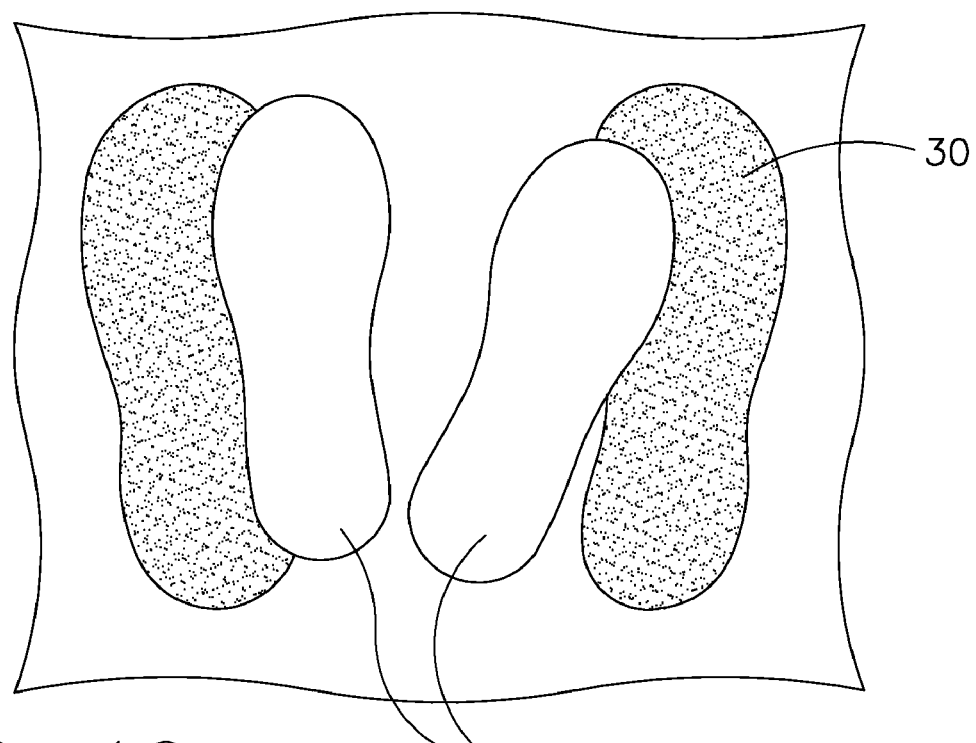
FIG. 16 is a first screen shot generated utilizing the system shown in FIGS. 1-8.

For example, FIG. 16 illustrates a first screen shot generated utilizing the system shown in FIGS. 1-8, and FIG. 17 is a second screen shot generated utilizing the system shown in FIGS. 1-8. As shown in FIG. 16, a passenger being inspected is positioned incorrectly within the screening area. Specifically, neither foot is positioned within the predetermined screening area, roughly outlined by the foot shaped outlines 400. As a result, means 220 will not initiate either a metal detection or explosive scan to screen the passenger. System 10 may then prompt the passenger to reposition their feet correctly within system 10.

Figure 17:
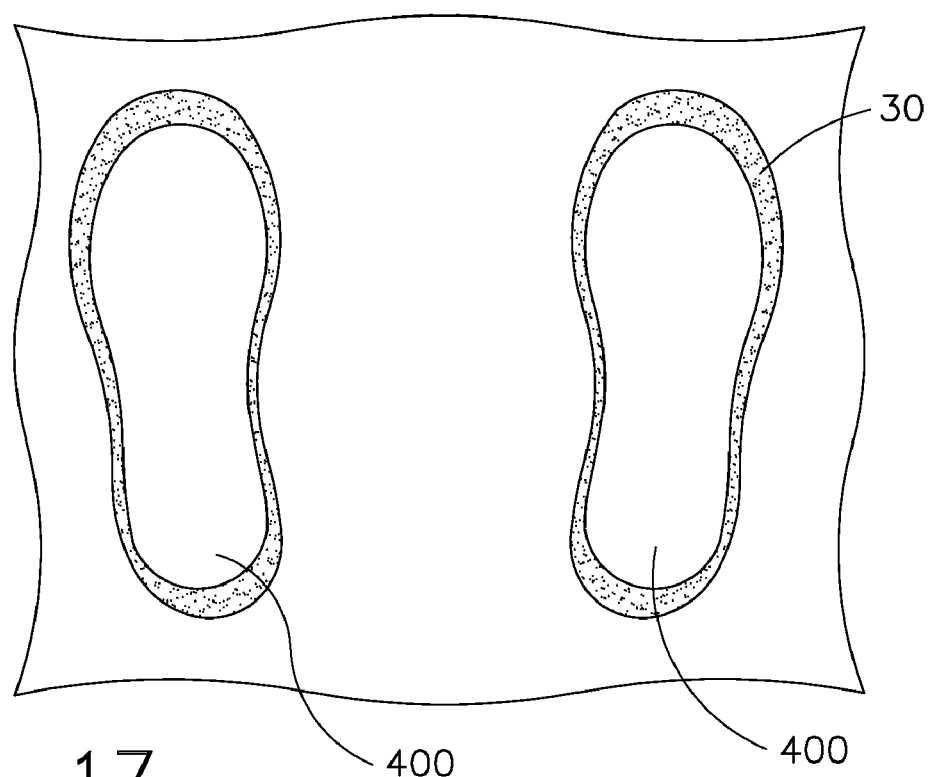
FIG. 17 is a second screen shot generated utilizing the system shown in FIGS. 1-8.

As shown in FIG. 17, means 220 has determined that passenger being inspected is positioned correctly within the screening area. Specifically, both foot are positioned within the predetermined screening area, roughly outlined by the foot shaped outlines 400. As a result, system 10 automatically initiates a metal detection and/or explosive scan to screen the passenger. Although, FIGS. 16 and 17 illustrate exemplary locations, illustrated as feet on the floor of the kiosk. It should be realized that in the exemplary embodiment, kiosk 22 does not include any visual indications installed on the floor of the kiosk to assist the passenger in properly aligning their feet to perform the inspection, rather kiosk 22 prompts the passenger utilizing the computer screen or an audio command to reposition their feet, as discussed above. However, in an optional embodiment, visual prompts may be installed on the floor of the kiosk to assist the passenger.

The screening system described herein is configured to automatically prompt a passenger to enter identity information and compare the entered information to information stored on a passenger's registration card. The screening system then prompts the passenger to position a body part on an identity verification apparatus, such as an iris scan device or a fingerprint scan device. System 10 then determines when the passenger's body part is positioned on the identity verification apparatus and performs a scan. System 10 is also configured to prompt a person to position portions of the body, such as the legs and feet for example, in a predetermined position to optimized both metal detection scanning and explosive scanning of the lower regions of the legs and feet. After determining that the passenger's body is properly positioned, system 10 automatically initiates the screening process to detect both metal and explosive materials that may be attached to the passenger's body.

Specifically, the system described herein is configured to prompt a passenger to enter the screening system, automatically determine when a passenger is within the screening system. The system then prompts the passenger to enter information that may be utilized by the screening system to verify the identity of the passenger. Once the passenger's identity is verified the screening system prompts the passenger to position a body part and then determines that the body part is correctly positioned.

The system described herein facilitates improving passenger flow through a security checkpoint within a travel terminal. Specifically, the system automatically prompts a passenger to be inspected to enter the system, prompts the passenger to position selected body parts in front of or on selected screening systems, determines that the body part is positioned on the screening system, and automatically initiates the screening process. As such, the system described herein facilitates guiding a passenger through a screening process and thus substantially reduces the amount of time required to screen a passenger within the travel terminal. As a result, more travelers may be screened in a reduced amount of time to further improve travel efficiency. Moreover, the system described herein is highly reliable. As a result, the detection of contraband and other possible dangerous devices is increased, while reducing the overall time required to detect the same items.

While the invention has been described in terms of various specific embodiments, those skilled in the art will recognize that the invention can be practiced with modification within the spirit and scope of the claims.

What is claimed is:

1. A method of operating a passenger screening kiosk system to perform at least one of verify a passenger's identity, detect the presence of an explosive material, and detect the presence of a metallic material, said method comprising:
    initiating a prompt to be issued by the passenger screening kiosk system to prompt the passenger to enter the passenger screening kiosk system;
    prompting the passenger to enter the passenger screening kiosk system;
    determining whether the passenger is within the passenger screening kiosk system; and
    verifying that feet of the passenger are positioned with the passenger screening kiosk system at predetermined locations by:
        verifying that a first foot is at a first predetermined location; and
        verifying that a second foot is at a second predetermined location.

2. The method in accordance with claim 1 further comprising:
    prompting the passenger to enter biometric identity information into an electronic card reader; and
    determining if the passenger has entered the biometric identity information into the electronic card reader.

3. The method in accordance with claim 1 further comprising:
    prompting the passenger to position a body part in a predetermined position; and
    determining if the body part is positioned in the predetermined position.

4. The method in accordance with claim 1 further comprising:
    prompting the passenger to position a finger onto a fingerprint scan device; and
    determining if the finger is positioned on the fingerprint scan device.

5. The method in accordance with claim 1 further comprising:
    prompting the passenger to position an eye proximate to an iris scan device; and
    determining if the eye is positioned proximate the iris scan device.

6. The method in accordance with claim 1 further comprising:
    prompting the passenger to place a fingertip on a trace explosive fingertip scanner;
    determining if the fingertip is positioned on the trace explosive fingertip scanner; and
    automatically activating the trace explosive fingertip scanner to analyze the fingertip for an explosive material.

7. The method in accordance with claim 1 wherein said verifying that the feet are at predetermined locations further comprises:
    prompting the passenger to position both of the feet within a predetermined screening area; and
    determining whether the feet are positioned within a predetermined screening area.

8. The method in accordance with claim 7 further comprising scanning at least a portion of the passenger to detect the presence of at least one of an explosive material and a metallic material if both the feet are within the predetermined screening area.

9. The method in accordance with claim 7 further comprising prompting the passenger to reposition at least one foot of the feet if the at least one foot is not within the predetermined screening area.

10. The method in accordance with claim 1 wherein the passenger screening kiosk system includes an inductive sensor, said method further comprising prompting the passenger to reposition both feet symmetrically over the induction sensor.

11. The method in accordance with claim 10 wherein the passenger screening kiosk system includes a quadrupole resonance detection system, said method further comprising scanning at least a portion of the passenger to detect the presence of an explosive material using the quadrupole resonance detection system.

12. The method in accordance with claim 1 wherein the passenger screening kiosk system includes at least two metal detection coils, said method further comprising:
- prompting the passenger to reposition both of the feet such that the feet are positioned symmetrically between the two metal detection coils; and
- determining if the feet are positioned symmetrically between the two metal detection coils.

13. The method in accordance with claim 1 further comprising:
- operating an infrared sensor array including at least one infrared transmitter and at least one infrared receiver to determine the distance between at least one foot of the feet and the infrared sensor array; and
- utilizing the determined distance to estimate at least one of a length of the at least one foot, a width of the at least one foot, a position of the at least one foot with respect to the infrared sensor array, and an angle of the at least one foot with respect to the infrared sensor array.

14. The method in accordance with claim 13 further comprising utilizing the determined and estimated distances to determine whether the feet are positioned within a predetermined screening area.

15. The method in accordance with claim 1 wherein the passenger screening kiosk system further includes a first camera and a second camera, said method further comprising:
- operating the first camera to generate a first image of the first foot;
- operating the second camera to generate a second image of the second foot;
- combining the first and second images; and
- determining a position of the first foot and a positioned of the second foot using the combined images.

16. The method in accordance with claim 1 wherein the passenger screening kiosk system further includes a first pressure sensor and a second pressure sensor, said method further comprising:
- prompting the passenger to reposition both of the feet such that the first foot activates the first pressure sensor and the second foot activates the second pressure sensor; and
- scanning at least a portion of the passenger to detect the presence of at least one of an explosive material and a metallic material when the first and second pressure sensors are both activated.

17. The method in accordance with claim 1 wherein the passenger screening kiosk system further includes an ultrasonic ranging system comprising at least one transmitter and at least one receiver, said method further comprising:
- activating the transmitter to emit a plurality of pulsed ultrasonic signals into at least a portion of the passenger;
- activating the receiver to receive echoes from the passenger; and
- determining whether the feet are positioned within a predetermined screening area utilizing the received echoes.

18. The method in accordance with claim 1 wherein the passenger screening kiosk system further includes a laser ranging device comprising at least one light emitting device and at least one light receiving device, said method further comprising:
- activating the light emitting device to emit a light pulse toward the passenger;
- activating the receiver to receive the light pulse reflected from the passenger;
- measuring the round trip time interval of the light pulse between the light emitting device and the receiver; and
- determining whether the feet are positioned within a predetermined screening area utilizing the measured round trip time interval.

19. A passenger screening kiosk system comprising:
- an identity verification system;
- a metal detection system;
- an explosives detection system; and
- a computer coupled to said identity verification system, said metal detection system, and said explosives detection system, said computer configured to:
  - prompt a passenger to enter said passenger screening kiosk system;
  - determine whether the passenger is within said passenger screening kiosk system; and
  - verify that feet of the passenger are positioned with said passenger screening kiosk system at predetermined locations by:
    - verifying that a first foot is at a first predetermined location; and
    - verifying in that a second foot is at a second predetermined location.

20. A passenger screening kiosk system in accordance with claim 19 further comprising:
- a kiosk including a first wall, a second wall, a third wall coupled between said first and second walls, and said computer; and
- a sensor coupled to at least one of said first and second walls, said sensor configured to provide at least one of an audio and visual indication when a passenger has entered or exited said kiosk.

21. A passenger screening kiosk system in accordance with claim 20 further comprising a position identifying means configured to determine a position of the feet within said kiosk, and determine whether the feet are positioned within a predetermined screening area.

22. A passenger screening kiosk system in accordance with claim 21 wherein said position identifying means comprises an infrared sensor array comprising at least one infrared transmitter and at least one infrared receiver.

23. A passenger screening kiosk system in accordance with claim 21 wherein said position identifying means comprises:
- a first camera configured to generate a first image of the first foot; and
- a second camera configured to generate a second image of the second foot, said computer further configured to combine the first and second images to determine whether the feet are positioned within the predetermined screening area.

24. A passenger screening kiosk system in accordance with claim 21 wherein said position identifying means comprises:
- a first pressure sensor configured to activate when depressed by the first foot; and
- a second pressure sensor configured to activate when depressed by the second foot.

25. A passenger screening kiosk system in accordance with claim 21 wherein said position identifying means comprises at least one ultrasonic transmitter and at least one ultrasonic receiver, said computer further configured to:
- activate said transmitter to emit a plurality of pulsed ultrasonic signals into at least a portion of the passenger;
- activate said receiver to receive echoes from the passenger; and
- determine whether the feet are positioned within a predetermined screening area utilizing the received echoes.

26. A passenger screening kiosk system in accordance with claim 21 wherein said position identifying means comprises a laser ranging device comprising at least one light emitting device and at least one light receiving device, said computer further configured to:
   activate said light emitting device to emit a light pulse toward the passenger;
   activate said receiver to receive the light pulse reflected from the passenger; and
   measure the round trip time interval of the light pulse between said light emitting device and said receiver.

27. A passenger screening kiosk system in accordance with claim 19 further comprising an identity verification system, said computer is further configured to:
   prompt the passenger to input information into said identity verification system; and
   verify the identity of the passenger based on the entered information.

28. A passenger screening kiosk system in accordance with claim 19 wherein said explosives detection system comprises a trace explosive fingertip scanner, said computer is further configured to:
   prompt a passenger to position a finger on the trace explosive fingertip scanner; and
   determine that the finger is positioned on the trace explosive fingertip scanner.

29. A passenger screening kiosk system in accordance with claim 19 wherein said explosives detection system comprises a quadrupole resonance detection system for scanning the passenger.

30. A passenger screening kiosk system in accordance with claim 19 wherein said identity verification system comprises a fingerprint scan device, said computer further configured to:
   prompt the passenger to position a finger onto said fingerprint scan device; and
   determine if the finger is positioned on said fingerprint scan device.

31. A passenger screening kiosk system in accordance with claim 19 wherein said identity verification system comprises an iris scan device, said computer further configured to:
   prompt the passenger to position an eye proximate said iris scan device; and
   determine if the eye is positioned proximate to the iris scan device.

* * * * *